United States Patent
Nakashima

(10) Patent No.: US 9,621,430 B2
(45) Date of Patent: Apr. 11, 2017

(54) SUPPORT APPARATUS, DESIGN SUPPORT METHOD, AND RECORDING MEDIUM

(71) Applicant: FUJITSU LIMITED, Kawasaki-shi, Kanagawa (JP)

(72) Inventor: Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 14/462,707

(22) Filed: Aug. 19, 2014

(65) Prior Publication Data

US 2015/0092599 A1   Apr. 2, 2015

(30) Foreign Application Priority Data

Sep. 27, 2013   (JP) .................................. 2013-202651

(51) Int. Cl.
*H04L 12/24*   (2006.01)

(52) U.S. Cl.
CPC ............ *H04L 41/12* (2013.01); *H04L 41/083* (2013.01); *H04L 41/145* (2013.01)

(58) Field of Classification Search
CPC ...... H04L 41/12; H04L 41/083; H04L 41/145
See application file for complete search history.

(56) References Cited

U.S. PATENT DOCUMENTS

| | | | |
|---|---|---|---|
| 6,334,156 B1 * | 12/2001 | Matsuoka ............... | H04L 45/04 370/351 |
| 7,468,982 B2 | 12/2008 | Mehra et al. | |
| 2008/0159742 A1 * | 7/2008 | Krishnaswamy ... | H04J 14/0227 398/79 |
| 2009/0087180 A1 * | 4/2009 | Allen .................. | H04J 14/0227 398/45 |
| 2011/0206062 A1 * | 8/2011 | Mitsunobu ............ | H04L 47/826 370/458 |

FOREIGN PATENT DOCUMENTS

JP   2000-253060   9/2000

OTHER PUBLICATIONS

JPOA—Japanese Office Action mailed on Feb. 14, 2017 for Japanese Patent Application No. 2013-202651, with English translation.

* cited by examiner

Primary Examiner — Ian N Moore
Assistant Examiner — Lakeram Jangbahadur
(74) *Attorney, Agent, or Firm* — Fujitsu Patent Center

(57) ABSTRACT

A design support apparatus includes a memory and a processor coupled to the memory. The processor executes a process including: accepting inputs of the number of nodes to be connected to a network, the number of networks to be connected to each node, and the number of nodes to be connected to a terminating device being a relay device to be connected to the nodes among relay devices relaying communication between nodes; calculating the number of terminating devices included in each network based on the numbers having been accepted; specifying nodes to be connected to each terminating device for each network such that each node is connected to any of the number of terminating devices calculated and that individually different combinations of nodes are connected to the terminating devices included in all the networks; and outputting connection information indicating that the nodes specified are connected to the terminating devices.

7 Claims, 22 Drawing Sheets

FIG.14

| 1 | 2 | 3 | 4 |
|---|---|---|---|
| 2 | 1 | 4 | 3 |
| 3 | 4 | 1 | 2 |
| 4 | 3 | 2 | 1 |

(a)

| 1 | 2 | 3 | 4 |
|---|---|---|---|
| 3 | 4 | 1 | 2 |
| 4 | 3 | 2 | 1 |
| 2 | 1 | 4 | 3 |

(b)

| 1 | 2 | 3 | 4 |
|---|---|---|---|
| 4 | 3 | 2 | 1 |
| 2 | 1 | 4 | 3 |
| 3 | 4 | 1 | 2 |

(c)

FIG.16
(f)
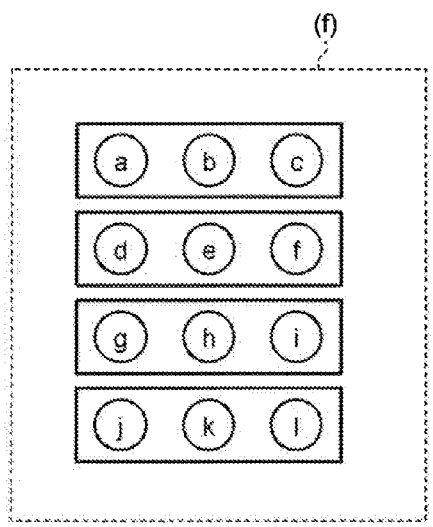
(g)
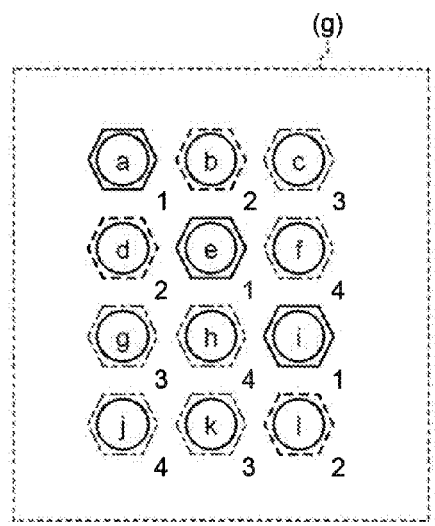
(h)
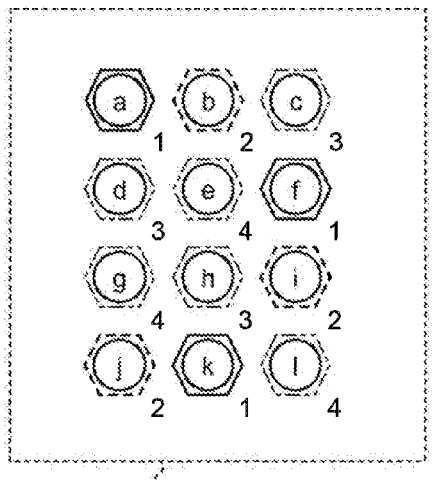
(i)
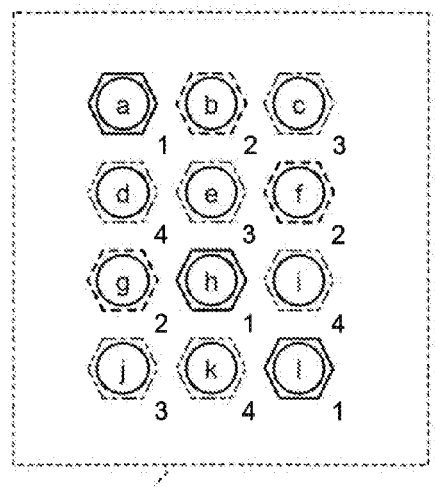

SUPPORT APPARATUS, DESIGN SUPPORT METHOD, AND RECORDING MEDIUM

CROSS-REFERENCE TO RELATED APPLICATION

This application is based upon and claims the benefit of priority of the prior Japanese Patent Application No. 2013-202651, filed on Sep. 27, 2013, the entire contents of which are incorporated herein by reference.

FIELD

The embodiments discussed herein are related to a design support apparatus, a design support method, and a recording medium.

BACKGROUND

A technology for networking a plurality of electronic devices, such as a plurality of servers or a plurality of processing units, that communicate with each other. Examples of such a technology include a technology for connecting the electronic devices by a plurality of networks to increase the bandwidth used by the electronic devices for communication, or to secure redundancy for improving the reliability of communication.

Hereinafter, a description is given of an example of the technology for connecting a plurality of electronic devices by a plurality of networks with reference to FIG. 23. FIG. 23 is a diagram illustrating an example of servers connected to a plurality of networks. In the examples illustrated in FIG. 23, servers a to d are simply described as a to d.

For example, in the example illustrated in (y) of FIG. 23, the servers a to d are connected to a network including switches 20 and 20a to 20c. In detail, the servers a and b are connected to the switch 20b, and the servers c and d to the switch 20c. Moreover, each of the switches 20b and 20c is connected to the switches 20 and 20a.

On the other hand, in the example illustrated in (z) of FIG. 23, the servers a to d are connected to the network including the switches 20 and 20a to 20c, and a network including switches 20d to 20g. In detail, as in the example illustrated in (y) of FIG. 23, the servers a to d are connected to the network including the switches 20 and 20a to 20c. Moreover, the servers a to d are connected to the network formed by the switches 20d to 20g, the network having the same topology as the network including the switches 20 and 20a to 20c.

As a consequence, in the example illustrated in (z) of FIG. 23, the servers a to d communicate via the network including the switches 20 and 20a to 20c, or the network including the switches 20d to 20g. As a consequence, in the network illustrated in (z) of FIG. 23, the bandwidth between the servers a to d is increased to the double of the network illustrated in (y) of FIG. 23.

Patent Document 1: Japanese Laid-open Patent Publication No. 2000-253060

However, if a plurality of electronic devices is connected to a plurality of networks having the same topology, there is a problem that it is not possible to reduce latency upon communications between the electronic devices.

For example, in the example illustrated in (y) of FIG. 23, the servers a and c perform communication on a communication channel via three switches 20b, 20, and 20c, or switches 20b, 20a, and 20c, in other words, a communication channel with the hop count of "three". As illustrated in (z) of FIG. 23, the network including the switches 20d to 20g has the same topology as the network including the switches 20 and 20a to 20c. Hence, if the servers a and c are communicated via the network including the switches 20d to 20g, communication is performed on the communication channel with the hop count of "three" as in the case where communication is performed via the network including the switches 20 and 20a to 20c.

In this manner, if the servers a to d are connected to the plurality of networks having the same topology, it is not possible to reduce latency in the communication between the servers a to d although the plurality of networks is connected to the servers a to d.

SUMMARY

According to an aspect of the embodiments, a design support apparatus includes: a memory; and a processor coupled to the memory, wherein the processor executes a process including: accepting inputs of the number of nodes to be connected to a network, the number of networks to be connected to each node, and the number of nodes to be connected to a terminating device being a relay device to be connected to the nodes among relay devices relaying communication between nodes; calculating the number of terminating devices included in each network based on the number of nodes, the number of networks, and the number of nodes to be connected to the terminating device, the numbers having been accepted at the accepting; specifying nodes to be connected to each terminating device for each network such that each node is connected to any of the number of terminating devices calculated at the calculating and that individually different combinations of nodes are connected to the terminating devices included in all the networks; and outputting connection information indicating that the nodes specified at the specifying are connected to the terminating devices.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram illustrating examples of mutually orthogonal Latin square data stored in the design support apparatus according to the second embodiment;

FIG. 16 is a diagram illustrating examples of networks to be designed by the design support apparatus according to the second embodiment;

DESCRIPTION OF EMBODIMENTS

Preferred embodiments will be explained with reference to accompanying drawings. The disclosed technology is not limited by the following embodiments. Moreover, the embodiments may be combined appropriately within a range creating no contradiction.

[a] First Embodiment

Figure 1:
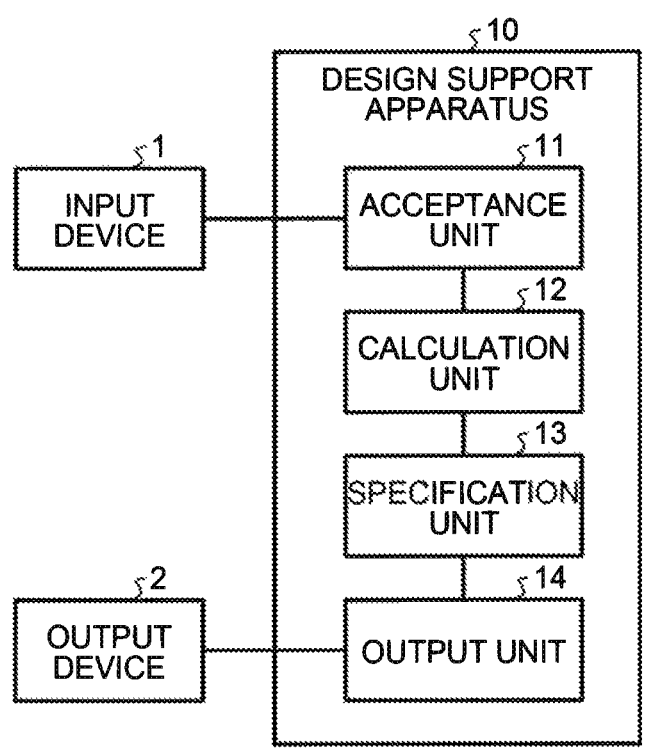
FIG. 1 is a diagram illustrating a functional configuration of a design support apparatus according to a first embodiment.

In the following first embodiment, an example of the design support apparatus according to the present application is described with reference to FIG. 1. FIG. 1 is a diagram illustrating a functional configuration of a design support apparatus according to a first embodiment. In the example illustrated in FIG. 1, a design support apparatus 10 is connected to an input device 1 and an output device 2. Moreover, the design support apparatus 10 includes an acceptance unit 11, a calculation unit 12, a specification unit 13, and an output unit 14.

when connecting a plurality of nodes communicating with each other to a plurality of networks, the design support apparatus 10 designs to which switch a node is connected.

Specifically, when accepting the inputs of parameters from a user, the design support apparatus 10 specifies which node is connected to a switch included in each network in accordance with the accepted parameters. The design support apparatus 10 then outputs connection information to the effect that the specified node is connected to each switch. The node is an electronic device including, for example, an information processing device such as a server, or a processing unit such as a CPU (Central Processing Unit).

Figure 2:
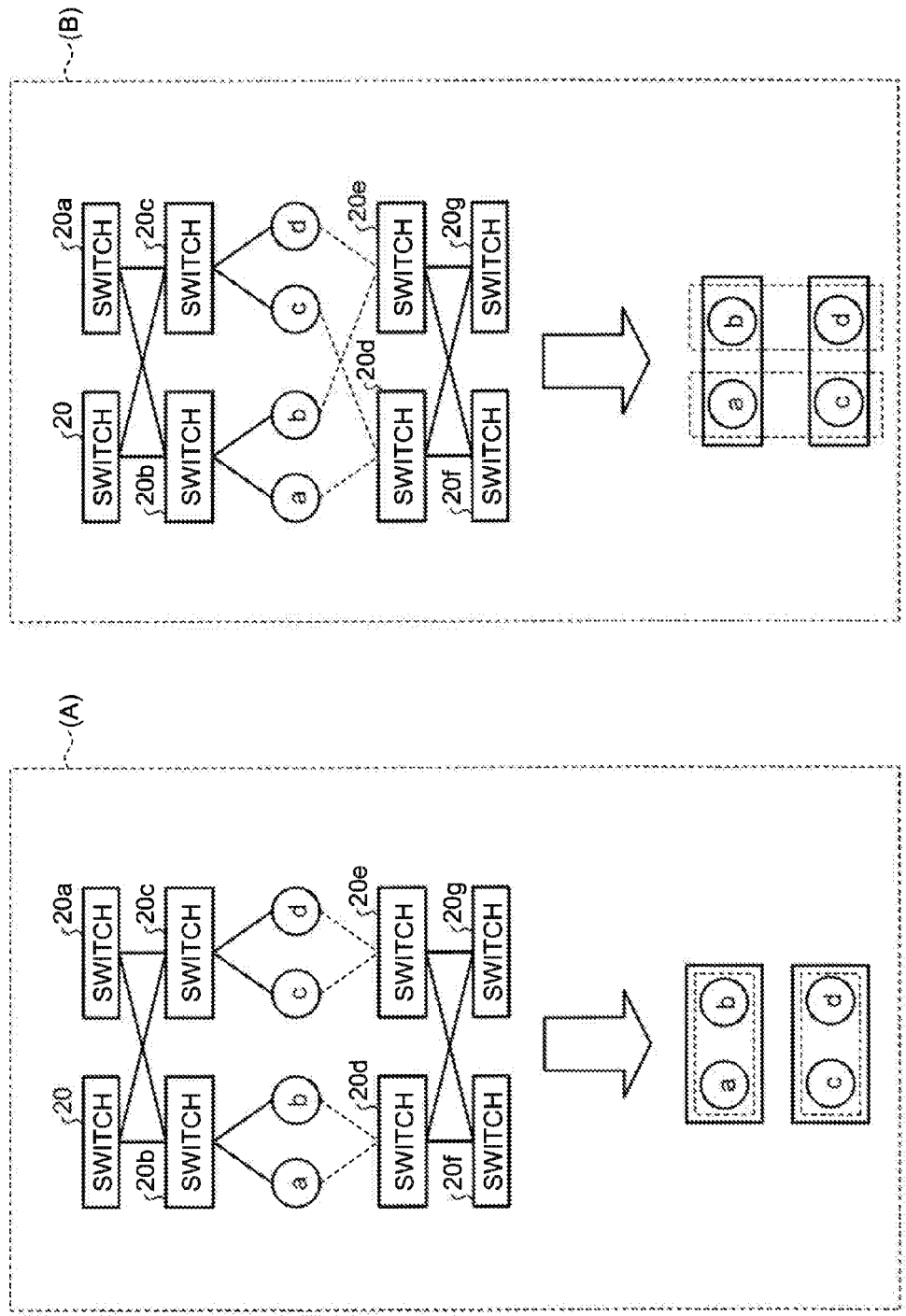
FIG. 2 is a diagram illustrating an outline of processes to be executed by the design support apparatus according to the first embodiment.

An outline of processes to be executed by the design support apparatus 10 is described with reference to FIG. 2. FIG. 2 is a diagram illustrating the outline of the processes to be executed by the design support apparatus according to the first embodiment. FIG. 2 describes examples where a plurality of nodes a to d is connected to two networks. In FIG. 2, the nodes a to d are simply described as a to d.

Figure 23:
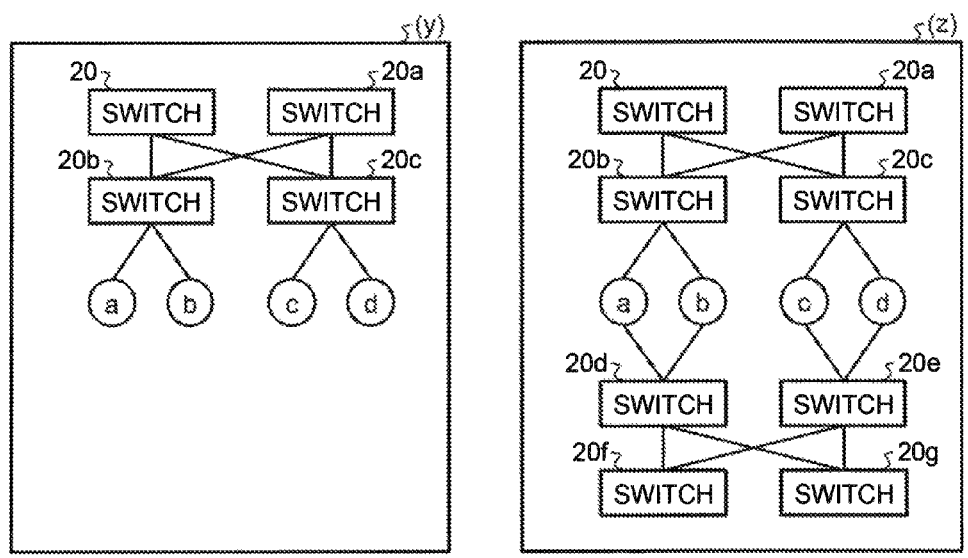
FIG. 23 is a diagram illustrating an example of servers connected to a plurality of networks.

For example, in the example illustrated in (A) of FIG. 2, the nodes a to d are connected to a network including switches 20 and 20a to 20c and a network including switches 20d to 20g, as in (y) of FIG. 23. In the example illustrated in (A) of FIG. 2, the network including the switches 20 and 20a to 20c, and the network including the switches 20d to 20g have the same topology.

Hence, as indicated by solid lines and dotted lines in (A) of FIG. 2, the hop counts of a communication channel between the nodes a and b, and a communication channel between the nodes c and d are "1". However, the hop counts of a communication channel between the nodes a and c, a communication channel between the nodes a and d, a communication channel between the nodes b and c, and a communication channel between the nodes b and d are "3" via any of the networks.

Hence, as illustrated in (B) of FIG. 2, the design support apparatus 10 designs the networks such that the topology of the network including the switches 20 and 20a to 20c and the topology of the network including the switches 20d and 20g are different. In detail, the design support apparatus 10 designs the network where the nodes a to d are connected to either of the switches 20b and 20c connected to the nodes a to d among the switches 20 and 20a to 20c. Moreover, the design support apparatus 10 designs the network where the nodes a to d are connected to either of the switches 20d and 20e among the switches 20d to 20g.

Furthermore, the design support apparatus 10 designs the networks where different groups of nodes are respectively connected to the switches 20b to 20e to be connected to the nodes a to d. In other words, the design support apparatus 10 specifies groups of nodes to be connected to the switches 20b to 20e such that there are no groups of nodes including two common nodes.

For example, in the example illustrated in (B) of FIG. 2, the design support apparatus 10 generates connection information to the effect that the nodes a and b are connected to the switch 20b, and the nodes c and d are connected to the switch 20c. Moreover, the design support apparatus 10 generates connection information to the effect that the nodes a and c are connected to the switch 20d, and the nodes b and d are connected to the switch 20e.

As a consequence, the design support apparatus 10 can set the hop counts of the communication channel between the nodes a and c and the communication channel between the nodes b and d to "1" without increasing the hop counts of the communication channel between the nodes a and b and the communication channel between the nodes c and d. Hence, the design support apparatus 10 can reduce delay when the nodes a to d perform communication. In the following description, a switch to which a node is connected is described as a terminating node.

Returning to FIG. 1, the description is continued. The input device 1 is an input device to input various parameters of a network to be designed, and is an input device such as a mouse, keyboard, or a touchpad. For example, the input device 1 accepts the number "m" of nodes to be connected to a network, and the number "n" of networks to be connected to each node as the various parameters from a user. Moreover, the input device 1 accepts the input of the number "d" of nodes to be connected to a terminating switch to be connected to nodes among the switches forming a network. In such a case, the input device 1 outputs the accepted values of the various parameters "m", "n", and "d" to the design support apparatus 10.

The output device 2 is an output device to output connection information, and is, for example, a display device, such as a monitor, to display connection information, or an output device, such as a printer, to print connection information. For example, when receiving connection information from the design support apparatus 10, the output device 2 displays the received connection information.

Next, the functional configuration of the design support apparatus 10 is described. The acceptance unit 11 accepts the values of the various parameters "m", "n", and "d" input by the user via the input device 1. In such a case, the acceptance unit 11 outputs the accepted values of the various parameters "m", "n", and "d" to the calculation unit 12.

The calculation unit 12 uses the various parameters input by the user to calculate the number of terminating switches of each network. In detail, when having accepted the values of the various parameters "m", "n", and "d" from the acceptance unit 11, the calculation unit 12 determines whether or not the number "n" of networks is "2". If the number "n" of networks is "2", the calculation unit 12 calculates the number "s" of terminating switches that can be connected to "m" nodes.

Specifically, the calculation unit 12 divides the number "m" of nodes by the number "d" of nodes of one switch and calculates a minimum integer greater than the divided value. For example, if "m=12" and "d=3," the calculation unit 12 calculates "s=4." The calculation unit 12 then outputs, to the specification unit 13, the received values of the various parameters, "m=12," "n=2," and "d=3," and the calculated value "s=4."

On the other hand, if the number "n" of networks is not "2", in other words, if the number "n" of networks is equal to or greater than "3", the calculation unit 12 calculates, as "s", an integer equal to or greater than the value obtained by dividing "m" by "d", the integer being a minimum number indivisible by any integer equal to or less than "n" other than 1. For example, if "m=17," "d=4," and "n=4," the calculation unit 12 sets, as the value of "s", an integer equal to or greater than "5", the integer being a minimum number indivisible by any integer equal to or less than "4" other than 1, that is, "5". The received values of the various parameters, "m=17," "d=4," and "n=4," and the calculated value "s=5" are output to the specification unit 13.

When connecting the input number of networks to the input number of nodes, the specification unit 13 specifies nodes to be connected to terminating switches of each network. Specifically, the specification unit 13 specifies nodes to be connected to each terminating switch such that each node is connected to all the networks. Moreover, the specification unit 13 specifies nodes to be connected to each terminating switch such that all combinations of nodes to be connected to the terminating switches are different from each other.

Hereinafter, an example of processes to be executed by the specification unit 13 is described, separating a case where the number "n" of networks is "2" and a case of "3" or more. For example, the specification unit 13 receives the various parameters "m=12," "n=2," "d=3," and "s=4" from the calculation unit 12. In such a case, the specification unit 13 assigns, to "12" nodes, numbers of a matrix form in which the number of nodes to be connected to a terminating switch, "3", is set as the number of elements in each row, and the number of terminating switches, "4," is the number of elements in each column. In detail, the specification unit 13 assigns, to the nodes, numbers (1, 1) to (1, 3), (2, 1) to (2, 3), (3, 1) to (3, 3), and (4, 1) to (4, 3).

Next, the specification unit 13 specifies nodes to which the same row number has been assigned, as a group of nodes to be connected to each terminating switch included in a first network. For example, if specifying nodes to be connected to the switches 20 and 20a to 20c included in the first network, the specification unit 13 specifies a group of the nodes to which the numbers (1, 1) to (1, 3) have been assigned, as a group of nodes to be connected to the switch 20. Moreover, the specification unit 13 specifies a group of the nodes to which the numbers (2, 1) to (2, 3) have been assigned, as a group of nodes to be connected to the switch 20a, and a group of the nodes to which the numbers (3, 1) to (3, 3) have been assigned, as a group of nodes to be connected to the switch 20b. Moreover, the specification unit 13 specifies a group of the nodes to which the numbers (4, 1) to (4, 3) have been assigned, as a group of nodes to be connected to the switch 20c.

If having simply specified a group of nodes having the same column number as a group of nodes to be connected to each terminating switch included in a second network, the specification unit 13 is not able to connect, to the second network, the nodes to which the numbers (4, 1) to (4, 3) have been assigned. Hence, the specification unit 13 specifies a group of nodes to which numbers have been assigned in which the row numbers and column numbers are different from each other by one, as a group of nodes to be connected to each terminating switch included in the second network.

For example, the specification unit 13 executes the following processes if specifying nodes to be connected to the switches 20d to 20g included in the second network. Firstly, the specification unit 13 selects the node to which the number (1, 1) has been assigned as a starting point. Moreover, the specification unit 13 calculates numbers in which the row numbers and the columns numbers are different by one starting with the number (1, 1), the number of the numbers having been obtained by subtracting 1 from the value of "d". Specifically, the specification unit 13 calculates two numbers (2, 2) and (3, 3) by sequentially adding one to the row number and the column number starting with the number (1, 1). The specification unit 13 then sets the nodes to which the number (1, 1) selected as the starting point and the calculated numbers (2, 2) and (3, 3) have been assigned, as a group of nodes to be connected to the switch 20d.

Next, the specification unit 13 selects, as a starting point, the node to which the number (2, 1) has been assigned in which the row number is different by one from the number (1, 1). Moreover, the specification unit 13 calculates two numbers (3, 2) and (4, 3) by sequentially adding one to the row number and the column number starting with the number (2, 1). The specification unit 13 then sets the nodes to which the number (2, 1) selected as the starting point, and the calculated numbers (3, 2) and (4, 3) have been assigned, as a group of nodes to be connected to the switch 20e.

Moreover, the specification unit 13 selects, as a starting point, the node to which the number (3, 1) has been assigned in which the row number is different by one from the number (2, 1). Moreover, the specification unit 13 calculates the number (4, 2) by adding one to the row number and column number of the number (3, 1). A number obtained by adding one to the row number and column number of the number (4, 2) is (5, 3). However, a node to which the number (5, 3) has been assigned does not exist. Hence, the specification unit 13 returns, to "1", the value of any number greater than the number of elements in the row or column number, and calculates a number. In detail, the specification unit 13 calculates a number (1, 3) if adding one to the row number and column number of the number (4, 2). The specification unit 13 then sets the nodes to which the number (3, 1) selected as the starting point, and the calculated numbers (4, 2) and (1, 3) have been assigned, as a group of nodes to be connected to the switch 20*f*.

Similarly, the specification unit 13 calculates numbers in which starting with the node to which the number (4, 1) has been assigned, the row numbers and the column numbers are different by one, that is, numbers (1, 2) and (2, 3). The specification unit 13 then sets the nodes to which the numbers (4, 1), (1, 2) and (2, 3) have been assigned, as a group of nodes to be connected to the switch 20*g*.

Figure 3:
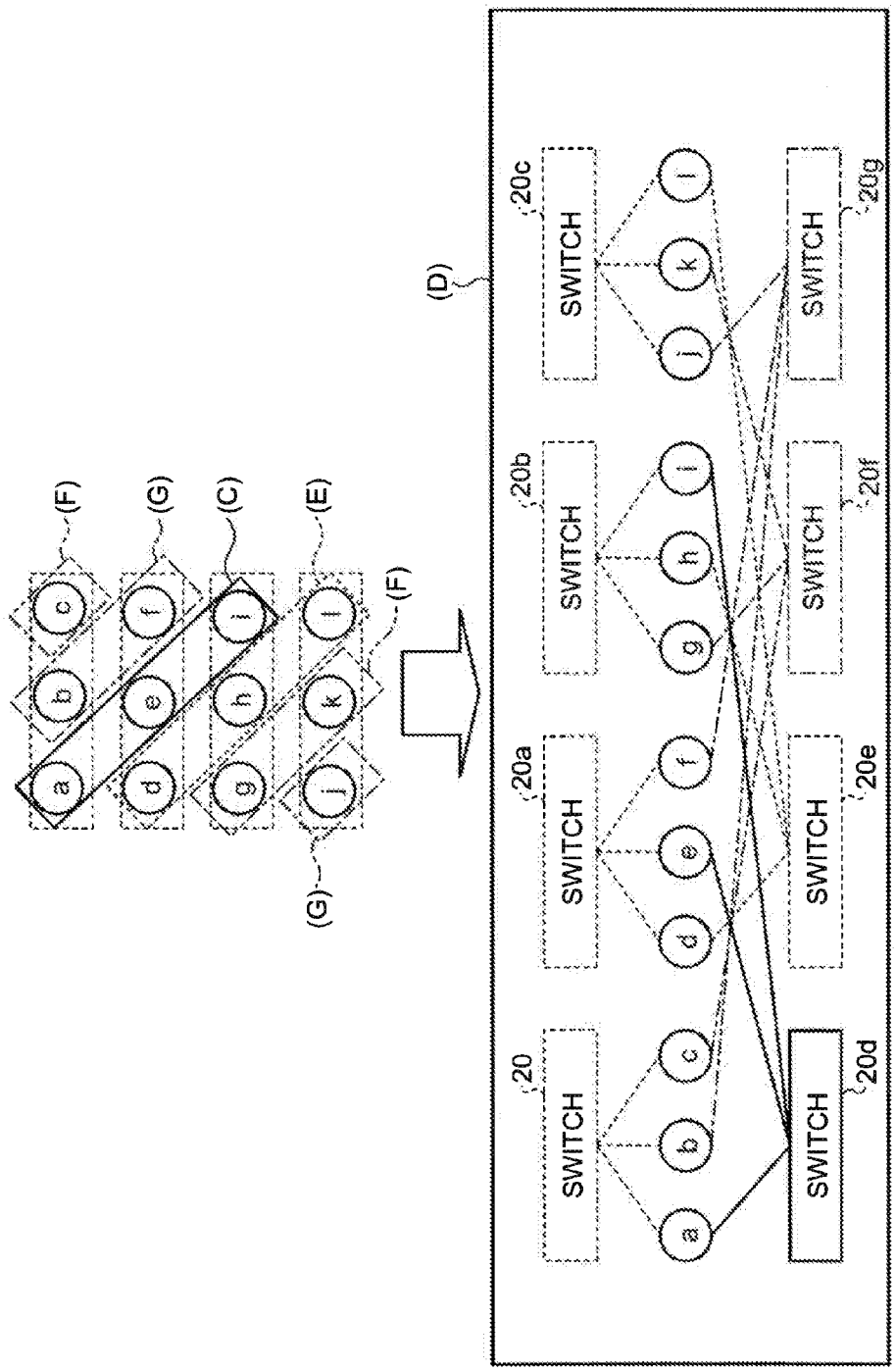
FIG. 3 is a diagram illustrating an example of networks to be output by the design support apparatus according to the first embodiment when there are two networks.

The execution of such processes allows the specification unit 13 to specify the groups of the nodes to be connected to the terminating switches as illustrated in FIG. 3. FIG. 3 is a diagram illustrating an example of networks to be output by the design support apparatus according to the first embodiment when there are two networks. In the example illustrated in FIG. 3, the connection relationships between the nodes a to l and the switches 20 and 20*a* to 20*g* are described. In the example illustrated in FIG. 3, the nodes a to l are displayed in the order of assigned numbers of a matrix form.

For example, as indicated by dotted lines in FIG. 3, the nodes a to c to which the numbers (1, 1) to (1, 3) are assigned are connected to the switch 20, and the nodes d to f to which the numbers (2, 1) to (2, 3) are assigned are connected to the switch 20*a*. Moreover, the nodes g to i to which the numbers (3, 1) to (3, 3) are assigned are connected to the switch 20*b*, and the nodes j to l to which the numbers (4, 1) to (4, 3) are assigned are connected to the switch 20*c*.

Moreover, the nodes a, e, and i to which the numbers (1, 1), (2, 2), and (3, 3) have been assigned as illustrated in (C) of FIG. 3 are connected to the switch 20*d* as indicated by solid lines in (D) of FIG. 3. Moreover, the nodes d, h, and 1 to which the numbers (2, 1), (3, 2), and (4, 3) have been assigned as illustrated in (E) of FIG. 3 are connected to the switch 20*e* as indicated by long dotted lines in (D) of FIG. 3. Moreover, the nodes g, k, and c to which the numbers (3, 1), (4, 2), and (1, 3) have been assigned as illustrated in (F) of FIG. 3 are connected to the switch 20*f* as indicated by two-dot broken lines in (D) of FIG. 3. Moreover, the nodes j, b, and f to which the numbers (4, 1), (1, 2), and (2, 3) have been assigned as illustrated in (G) of FIG. 3 are connected to the switch 20*g* as indicated by one-dot broken lines in (D) of FIG. 3.

As a consequence, the group of the nodes a to c, the group of the nodes d to f, the group of the nodes g to i, and the group of the nodes j to l can respectively perform communication between nodes by one hop through the switches 20 and 20*a* to 20*c*. Furthermore, the group of the nodes a, e, and i, and the group of the nodes d, h, and l can respectively perform communication between nodes by one hop through the switches 20*d* and 20*e*. Moreover, the group of the nodes g, k, and c, and the group of the nodes j, b, and f can respectively perform communication between nodes by one hop through the switches 20*f* and 20*g*. Hence, the design support apparatus 10 can reduce delay in communication between nodes.

The specification unit 13 also specifies the connection relationship between terminating switches included in each network. For example, the specification unit 13 specifies a switch that connects the switches 20, 20*a*, and 20*b*, and a switch that connects the switches 20*a* to 20*c* for the first network. Moreover, the specification unit 13 specifies a switch that connects the switches 20*d* to 20*f* and a switch that connects the switches 20*e* to 20*g* for the second network.

Next, a description is given of the flow of processes to be executed by the specification unit 13 if the number "n" of networks is equal to or greater than "3". For example, if the processes to be executed when the number "n" of networks is "2" are simply extended, the specification unit 13 may connect two nodes common to a plurality of terminating switches.

Figure 4:
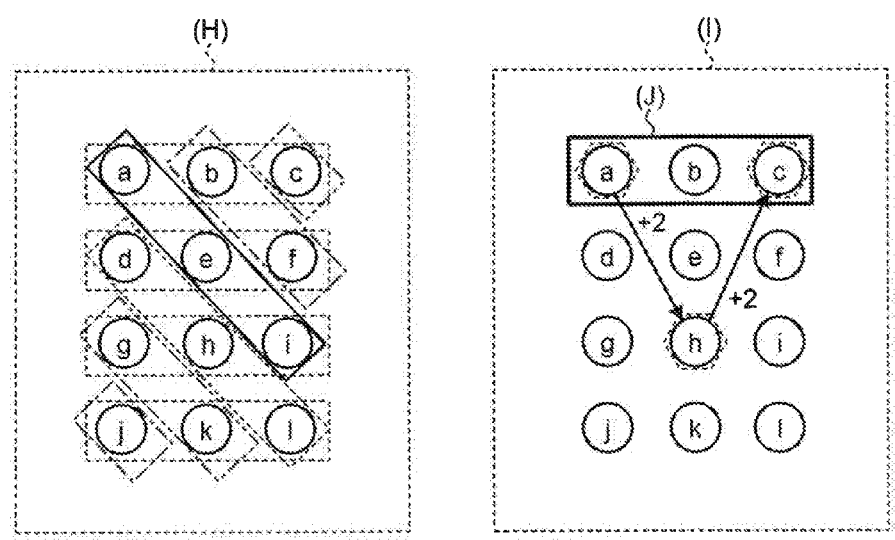
FIG. 4 is a first diagram illustrating processes to be executed by the design support apparatus according to the first embodiment when there are three networks.

For example, FIG. 4 is a first diagram illustrating processes to be executed by the design support apparatus according to the first embodiment when there are three networks. FIG. 4 describes groups of nodes to be connected to terminating switches when the values of the various parameters are "m=12," "n=3," "d=3," and "s=4." For example, the specification unit 13 executes the above-mentioned processes to specify groups of nodes similar to those in FIG. 3 as groups of nodes to be connected to terminating switches included in a first and a second network as illustrated in (H) of FIG. 4.

For example, the process to calculate a number obtained by sequentially adding one to the column number and two to the row number starting with the number of a node being a starting point, and specify a node of the calculated number can be considered to be the process to specify a group of nodes to be connected to a terminating switch included in a third network. However, if the specification unit 13 executes such a process, a group including the same nodes may be connected to a plurality of terminating switches when the number of switches is multiples of two, as illustrated in (I) of FIG. 4.

In detail, as illustrated in (J) of FIG. 4, the specification unit 13 specifies the nodes a to c as a group of nodes to be connected to a terminating switch included in the first network. However, if executing the above-mentioned process, the specification unit 13 specifies the nodes a, h, and c as a group of nodes to be connected to a terminating switch included in the third network. As a consequence, the specification unit 13 connects the group of the nodes a and c to two terminating switches. As a consequence of the existence of two communication channels that connect the nodes a and c by one hop, the number of combinations of nodes that can perform communication by one hop is reduced.

Hence, the design support apparatus 10 executes the following process: Firstly, as described above, if the number "n" of networks is equal to or greater than "3", the calculation unit 12 calculates, as "s", a minimum number that is an integer equal to or greater than the value obtained by dividing "m" by "d" and that is indivisible by any integer equal to or less than "n" other than 1. On the other hand, the specification unit 13 assigns numbers of a matrix form to "m" nodes and "d×s−m" virtual nodes.

The specification unit 13 then specifies a group of nodes to be connected to a terminating switch included in each network. Specifically, the specification unit 13 specifies nodes to which numbers (k, 1), (k+p, 2), (k+3p, 4) . . . (k+(d−1)p, d) have been assigned, as d nodes to be connected to a k-th terminating switch included in a p-th network. p is an integer equal to or greater than 0 and equal to or less than n−1. k is an integer equal to or greater than 0 and equal to or less than s−1. In other words, the specification unit 13 specifies a group of nodes to which numbers have been assigned in which the row numbers are different by the same value as an integer number assigned to the network whenever the column numbers are different by one.

Figure 5:
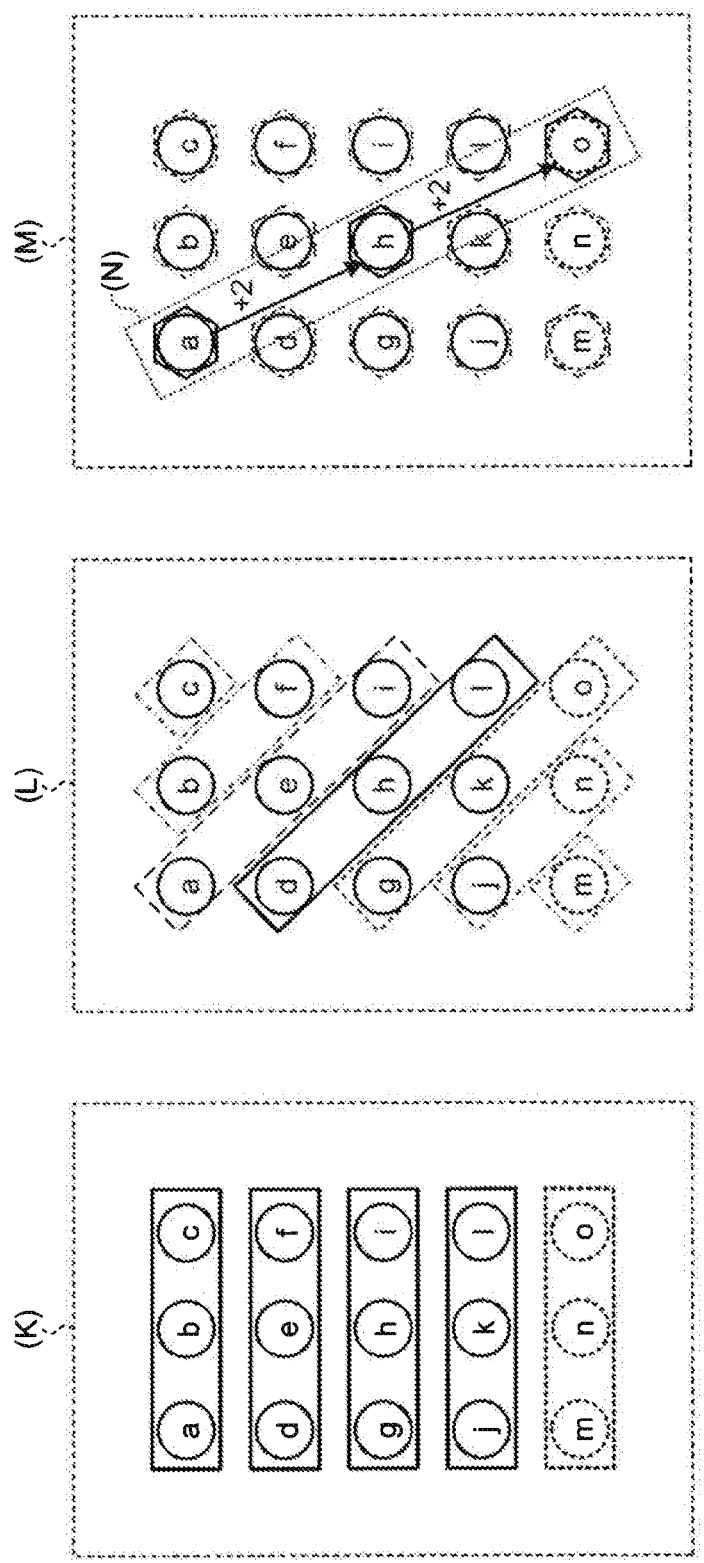
FIG. 5 is a second diagram illustrating processes to be executed by the design support apparatus according to the first embodiment when there are three networks.

Hereinafter, a description is given of examples of groups of nodes to be specified by the specification unit 13 when there are three networks, with reference to FIG. 5. FIG. 5 is a second diagram illustrating processes to be executed by the design support apparatus according to the first embodiment when there are three networks. FIG. 5 describes groups of nodes to be connected to terminating switches when the values of the various parameters are "m=12," "n=3," and "d=3." Moreover, in the examples illustrated in FIG. 5, nodes are described in matrix form in accordance with numbers to be assigned to the nodes, and virtual nodes are encircled by dotted circles.

For example, if the values of the various parameters are "m=12," "n=3," and "d=3," the calculation unit 12 calculates the number of terminating switches, "s=5." If there are "5" terminating switches, 15 nodes in total can be connected. Hence, the specification unit 13 assigns numbers of the matrix form where the number of elements in each row is "3", and the number of elements in each column is "5", to 12 nodes a to l and 3 virtual nodes m to o.

As illustrated in (K) of FIG. 5, the specification unit 13 then specifies a group of nodes having the same row number as a group of nodes to be connected to each terminating switch included in a zeroth network. In detail, the specification unit 13 specifies the nodes a to c to be connected to a first terminating switch, the nodes d to f to be connected to a second terminating switch, and the nodes g to i to be connected to a third terminating switch. Moreover, the specification unit 13 specifies the nodes j to l to be connected to a fourth terminating switch, and the nodes m to o to be connected to a fifth terminating switch. The nodes m to o are virtual nodes. Accordingly, no node is connected to the fifth terminating switch included in the zeroth network.

Moreover, as illustrated in (L) of FIG. 5, the specification unit 13 specifies a group of nodes in which the row numbers and the column numbers are different by one, as a group of nodes to be connected to each terminating switch included in a first network. In detail, the specification unit 13 specifies the nodes a, e, and i to be connected to a first terminating switch, the nodes d, h, and l to be connected to a second terminating switch, and the nodes g, k, and o to be connected to a third terminating switch. Moreover, the specification unit 13 specifies the nodes j, n, and c to be connected to a fourth terminating switch, and the nodes m, b, and f to be connected to a fifth terminating switch. The nodes m to o are virtual nodes. Accordingly, only the nodes g and k are connected to the third terminating switch included in the first network, only the nodes j and c to the fourth terminating switch, and the nodes b and f to the fifth terminating switch.

Moreover, as illustrated in (M) of FIG. 5, the specification unit 13 specifies a group of nodes in which the row numbers are different by two whenever the column numbers are different by one, as a group of nodes to be connected to each terminating switch included in a second network. In detail, as illustrated in (N) of FIG. 5, the specification unit 13 specifies the nodes a, h, and o encircled by hexagons in solid lines, as nodes to be connected to a first terminating switch. Moreover, the specification unit 13 specifies the nodes d, k and c encircled by hexagons in dotted lines, as nodes to be connected to a second terminating switch, and the nodes g, n, and f encircled by hexagons in one-dot broken lines, as nodes to be connected to a third terminating switch.

Moreover, the specification unit 13 specifies the nodes j, b and i encircled by hexagons in two-dot broken lines, as nodes to be connected to a fourth terminating switch, and the nodes m, e, and l encircled by hexagons in long dotted lines, as nodes to be connected to a fifth terminating switch. The nodes m to o are virtual nodes. Accordingly, only the nodes a and h are connected to the first switch, only the nodes g and f to the third switch, and only the nodes e and l to the fifth switch.

Moreover, the specification unit 13 also specifies connection relationships between the terminating switches included in each of the zeroth to second networks illustrated in FIG. 5. A given known technology can be applied to the process to design the connection relationships between the terminating switches. However, for example, the specification unit 13 calculates the value obtained by adding one to the number of nodes to be connected to a terminating switch, that is, the number of ports included in each switch. The specification unit 13 may design the connection relationships between the terminating switches for each network based on the calculated number of ports, the number of terminating switches, and the number of nodes.

Moreover, if designing a tree network, the specification unit 13 may accept the designation of the number of levels of switches in each network from a user and design a tree network having the accepted number of levels. Moreover, the specification unit 13 may design a network in which terminating switches are connected in a fabric.

The specification unit 13 subsequently outputs, to the output unit 14, a group of nodes to be connected to each terminating switch, the connection relationship of each terminating switch, and the values of the parameters "m", "n", "d", and "s". Moreover, if there is a virtual node, the specification unit 13 notifies the output unit 14 of a number assigned to the virtual node. For example, the specification unit 13 notifies the output unit 14 of numbers assigned to nodes to be connected to the k-th terminating switch included in the p-th network.

In the above-mentioned example, the calculation unit 12 and the specification unit 13 execute different processes between cases of "n=2" and "n≥3." However, the embodiment is not limited to this. In other words, the calculation unit 12 and the specification unit 13 execute similar processes to the case of "n≥3" even if the value of n is 2 and accordingly can specify individually different groups of nodes as groups of nodes to be connected to terminating switches in each network.

Return to FIG. 1. The output unit 14 outputs connection information to the effect of connecting, to a terminating switch, the group of nodes specified by the specification unit 13. For example, the output unit 14 receives, from the specification unit 13, the values of the parameters "m", "n", "d", and "s", the numbers assigned to the nodes to be connected to the k-th terminating switch included in the p-th network, and the connection relationships between the terminating switches. In such a case, the output unit 14 generates a connection table indicating the connections between the nodes and the terminating switches using the received information, and outputs the generated connection table to the output device 2.

Figure 6:
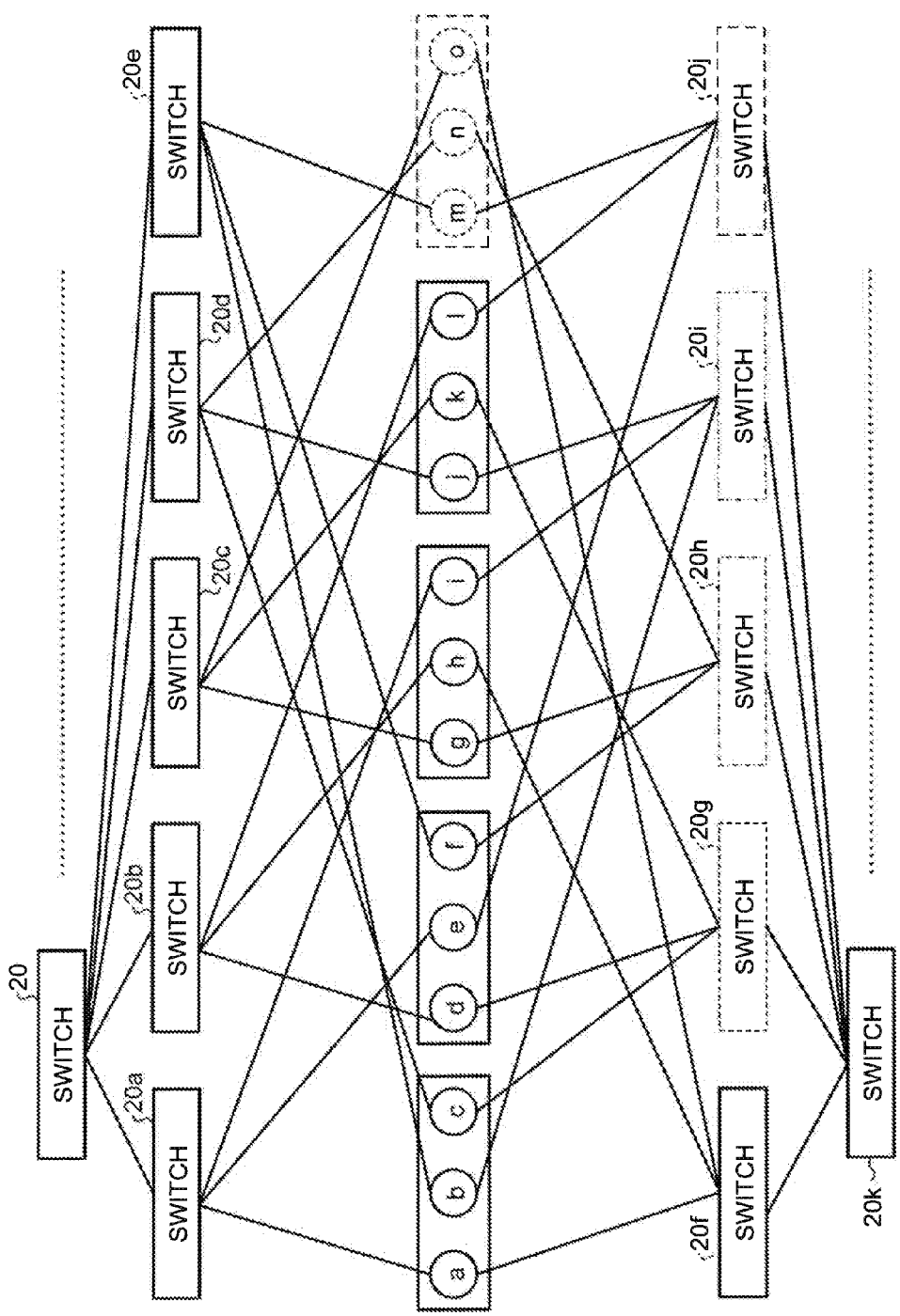
FIG. 6 is a diagram illustrating an example of groups of nodes to be specified by the design support apparatus according to the first embodiment when there are three networks.

An example of the connection table to be output by the output unit 14 is described with reference to FIG. 6. FIG. 6 is a diagram illustrating an example of groups of nodes to be specified by the design support apparatus according to the first embodiment when there are three networks. FIG. 6 describes an example of the connection table to be output by the output unit 14 when the specification unit 13 has specified the groups of nodes illustrated in FIG. 5 as groups of nodes to be connected to terminating switches in each network.

For example, the output unit 14 arranges the nodes a to l indicated by circles in solid lines in a horizontal line, and arranges the virtual nodes m to o indicated by circles in dotted lines next to the nodes a to l. The output unit 14 then displays each group of nodes as a group of nodes to be connected to each terminating switch included in the zeroth network by enclosing the nodes a to c, the nodes d to f, the nodes g to i, the nodes j to l, and the nodes m to o in boxes, respectively.

Moreover, the output unit 14 draws the switches 20a to 20e as the terminating switches included in the first network.

The output unit 14 then links the switches 20a to 20e and the groups of the nodes described in (L) of FIG. 5 in solid lines and accordingly draws the groups of the nodes to be connected to the switches 20a to 20e included in the first network. Moreover, the output unit 14 draws the switches 20f to 20j as the terminating switches included in the second network. The output unit 14 then links the switches 20f to 20j and the groups of the nodes described in (M) of FIG. 5 in solid lines and accordingly draws the groups of the nodes to be connected to the switches 20f to 20j included in the second network.

Moreover, the output unit 14 draws the switch 20 that connects the switches 20a to 20e, and a switch 20k that connects the switches 20f to 20j. The output unit 14 then outputs data on the drawn connection table to the output device 2, and displays the connection table on a screen, or makes the connection table to be printed. As a consequence, the design support apparatus 10 can output, to the user, the connection information that constructs the networks having short communication delay between the nodes.

Next, another example of processes to be executed by the design support apparatus 10 is described with reference to FIGS. 7 to 9. In the following description, a description is given of the flow of processes to be executed by the design support apparatus 10 if the various parameters are "m=17," "n=4," and "d=4." Firstly, a description is given of an example of a process in which the design support apparatus 10 specifies groups of nodes to be connected to terminating switches, with reference to FIG. 7.

Figure 7:
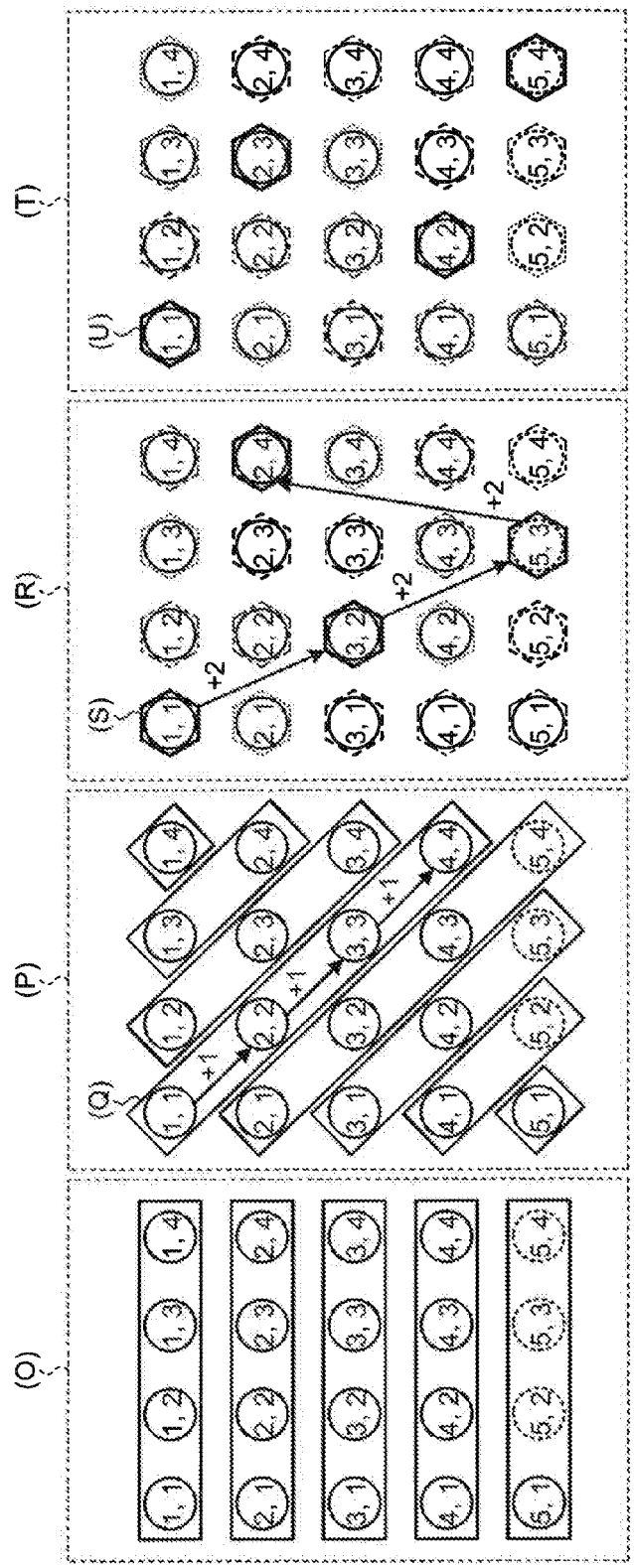
FIG. 7 is a diagram illustrating groups of nodes to be specified by the design support apparatus according to the first embodiment.

FIG. 7 is a diagram illustrating groups of nodes to be specified by the design support apparatus according to the first embodiment. In the examples illustrated in FIG. 7, nodes are indicated by circles in solid lines, and virtual nodes by circles in dotted lines. Moreover, in the examples illustrated in FIG. 7, numbers to be assigned to the nodes and virtual nodes are described in the circles. For example, the design support apparatus 10 accepts the inputs of the various parameters "m=17," "n=4," and "d=4." In such a case, the design support apparatus 10 calculates an integer "5" that is an integer greater than "m/d=4.25" and that is indivisible by integers "4", "3", and "2" less than "4.25" other than "1", as the number "s" of terminating switches included in one network.

If "d=4," 20 nodes in total can be connected to "s=5" terminating switches. Hence, the design support apparatus 10 assigns numbers of a matrix form to 17 nodes and three virtual nodes. As illustrated in (O) of FIG. 7, the design support apparatus 10 then specifies nodes to which the same row number has been assigned, as a group of nodes to be connected to a terminating switch included in a zeroth network.

For example, the design support apparatus 10 specifies nodes to which numbers (1, 1) to (1, 4) have been assigned, as a group of nodes to be connected to a zeroth terminating switch, and nodes to which numbers (2, 1) to (2, 4) have been assigned, as a group of nodes to be connected to a first terminating switch. Moreover, the design support apparatus 10 specifies nodes to which numbers (3, 1) to (3, 4) have been assigned, as a group of nodes to be connected to a second terminating switch, and nodes to which numbers (4, 1) to (4, 4) have been assigned, as a group of nodes to be connected to a third terminating switch. Moreover, the design support apparatus 10 specifies nodes to which numbers (5, 1) to (5, 4) have been assigned, as nodes to be connected to a fourth terminating switch.

Moreover, as illustrated in (P) of FIG. 7, the design support apparatus 10 specifies nodes in which the row numbers and the column numbers are different by one, as a group of nodes to be connected to a terminating switch included in a first network. For example, as illustrated in (Q) of FIG. 7, the design support apparatus 10 specifies the nodes to which the numbers (1, 1), (2, 2), (3, 3), and (4, 4) have been assigned, as a group of nodes to be connected to a zeroth terminating switch.

Moreover, the design support apparatus 10 specifies the nodes to which the numbers (2, 1), (3, 2), (4, 3), and (5, 4) have been assigned, as a group of nodes to be connected to a first terminating switch. Moreover, the design support apparatus 10 specifies the nodes to which the numbers (3, 1), (4, 2), (1, 4), and (5, 3) have been assigned, as a group of nodes to be connected to a second terminating switch. Moreover, the design support apparatus 10 specifies the nodes to which the numbers (4, 1), (5, 2), (1, 3), and (2, 4) have been assigned, as a group of nodes to be connected to a third terminating switch. Moreover, the design support apparatus 10 specifies the nodes to which the numbers (5, 1), (1, 2), (2, 3), and (3, 4) have been assigned, as a group of nodes to be connected to a fourth terminating switch.

Moreover, as illustrated in (R) of FIG. 7, the design support apparatus 10 specifies nodes in which the row numbers are different by two whenever the column numbers are different by one, as a group of nodes to be connected to a terminating switch included in a second network. For example, as illustrated in (S) of FIG. 7, the design support apparatus 10 specifies the nodes to which the numbers (1, 1), (3, 2), (5, 3), and (2, 4) indicated by hexagons in bold lines have been assigned, as a group of nodes to be connected to a zeroth terminating switch.

Moreover, the design support apparatus 10 specifies the nodes to which the numbers (2, 1), (4, 2), (1, 3), and (3, 4) indicated by hexagons in thin dotted lines have been assigned, as a group of nodes to be connected to a first terminating switch. Moreover, the design support apparatus 10 specifies the nodes to which the numbers (3, 1), (5, 2), (2, 3), and (4, 4) indicated by hexagons in bold dotted lines have been assigned, as a group of nodes to be connected to a second terminating switch. Moreover, the design support apparatus 10 specifies the nodes to which the numbers (4, 1), (1, 2), (3, 3), and (5, 4) indicated by hexagons in two-dot broken lines have been assigned, as a group of nodes to be connected to a third terminating switch. Moreover, the design support apparatus 10 specifies the nodes to which the numbers (5, 1), (2, 2), (4, 3), and (1, 4) indicated by hexagons in one-dot broken lines have been assigned, as a group of nodes to be connected to a fourth terminating switch.

Moreover, as illustrated in (T) of FIG. 7, the design support apparatus 10 specifies nodes in which the row numbers are different by three whenever the column numbers are different by one, as a group of nodes to be connected to a terminating switch included in a third network. For example, as illustrated in (U) of FIG. 7, the design support apparatus 10 specifies the nodes to which the numbers (1, 1), (4, 2), (2, 3), and (5, 4) indicated by hexagons in bold lines have been assigned, as a group of nodes to be connected to a zeroth terminating switch.

Moreover, the design support apparatus 10 specifies the nodes to which the numbers (2, 1), (5, 2), (3, 3), and (1, 4) indicated by hexagons in thin dotted lines have been assigned, as a group of nodes to be connected to a first terminating switch. Moreover, the design support apparatus 10 specifies the nodes to which the numbers (3, 1), (1, 2), (4, 3), and (2, 4) indicated by hexagons in bold dotted lines have been assigned, as a group of nodes to be connected to a second terminating switch. Moreover, the design support apparatus 10 specifies the nodes to which the numbers (4, 1), (2, 2), (5, 3), and (3, 4) indicated by hexagons in two-dot broken lines have been assigned, as a group of nodes to be connected to a third terminating switch. Moreover, the design support apparatus 10 specifies the nodes to which the numbers (5, 1), (3, 2), (1, 3), and (4, 4) indicated by hexagons in one-dot broken lines have been assigned, as a group of nodes to be connected to a fourth terminating switch.

The design support apparatus 10 subsequently generates the connection tables illustrated in FIGS. 8 and 9 and outputs the generated connection tables. FIG. 8 is a first diagram illustrating an example of connection tables to be output by the design support apparatus according to the first embodiment when the parameters are generalized. Moreover, FIG. 9 is a second diagram illustrating an example of connection tables to be output by the design support apparatus according to the first embodiment when the parameters are generalized.

Figure 8:
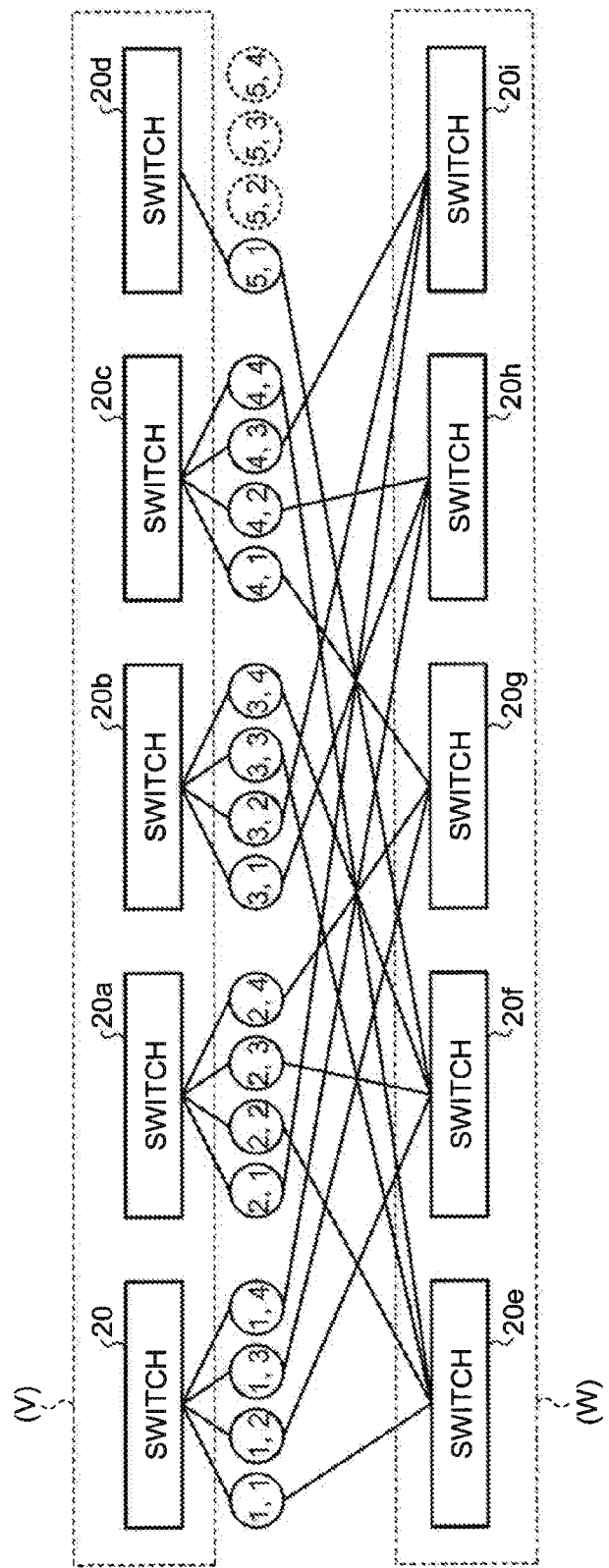
FIG. 8 is a first diagram illustrating an example of connection tables to be output by the design support apparatus according to the first embodiment when parameters are generalized.

FIG. 8 describes the connection tables indicating the groups of the nodes to be connected to the terminating switches included in the zeroth and first networks among the groups of the nodes specified by the design support apparatus 10. Moreover, FIG. 9 describes the connection tables indicating the groups of the nodes to be connected to the terminating switches included in the second and third networks among the groups of the nodes specified by the design support apparatus 10. Moreover, in the examples illustrated in FIGS. 8 and 9, descriptions of switches connecting the terminating switches are omitted.

For example, as illustrated in (V) of FIG. 8, the design support apparatus 10 describes the connections between the groups of the nodes illustrated in (O) of FIG. 7 and the switches 20 and 20a to 20d being the terminating switches included in the zeroth network. The switches 20 and 20a to 20d correspond respectively to the zeroth to fourth terminating switches.

For example, the design support apparatus 10 generates a connection table indicating that the nodes (1, 1) to (1, 4) are connected to the switch 20, the nodes (2, 1) to (2, 4) to the switch 20a, and the nodes (3, 1) to (3, 4) to the switch 20b. Moreover, the design support apparatus 10 generates a connection table indicating that the nodes (4, 1) to (4, 4) are connected to the switch 20c, and the node (5, 1) to the switch 20d. The design support apparatus 10 does not describe, in the connection table, the virtual nodes to which the numbers (5, 2) to (5, 4) have been assigned.

Moreover, as illustrated in (W) of FIG. 8, the design support apparatus 10 describes the connections between the groups of the nodes illustrated in (P) of FIG. 7 and the switches 20e to 20i being the terminating switches included in the first network. The switches 20e to 20i correspond sequentially to the zeroth, fourth, third, second, and first terminating switches.

For example, the design support apparatus 10 generates a connection table indicating that the nodes (1, 1), (2, 2), (3, 3), and (4, 4) are connected to the switch 20e, and the nodes (1, 2), (2, 3), (3, 4), and (5, 1) to the switch 20f. Moreover, the design support apparatus 10 generates a connection table indicating that the nodes (1, 3), (2, 4), and (4, 1) are connected to the switch 20g, and the nodes (1, 4), (3, 1), and (4, 2) to the switch 20h. Moreover, the design support apparatus 10 generates a connection table indicating that the nodes (2, 1), (3, 2), and (4, 3) are connected to the switch 20i.

Figure 9:
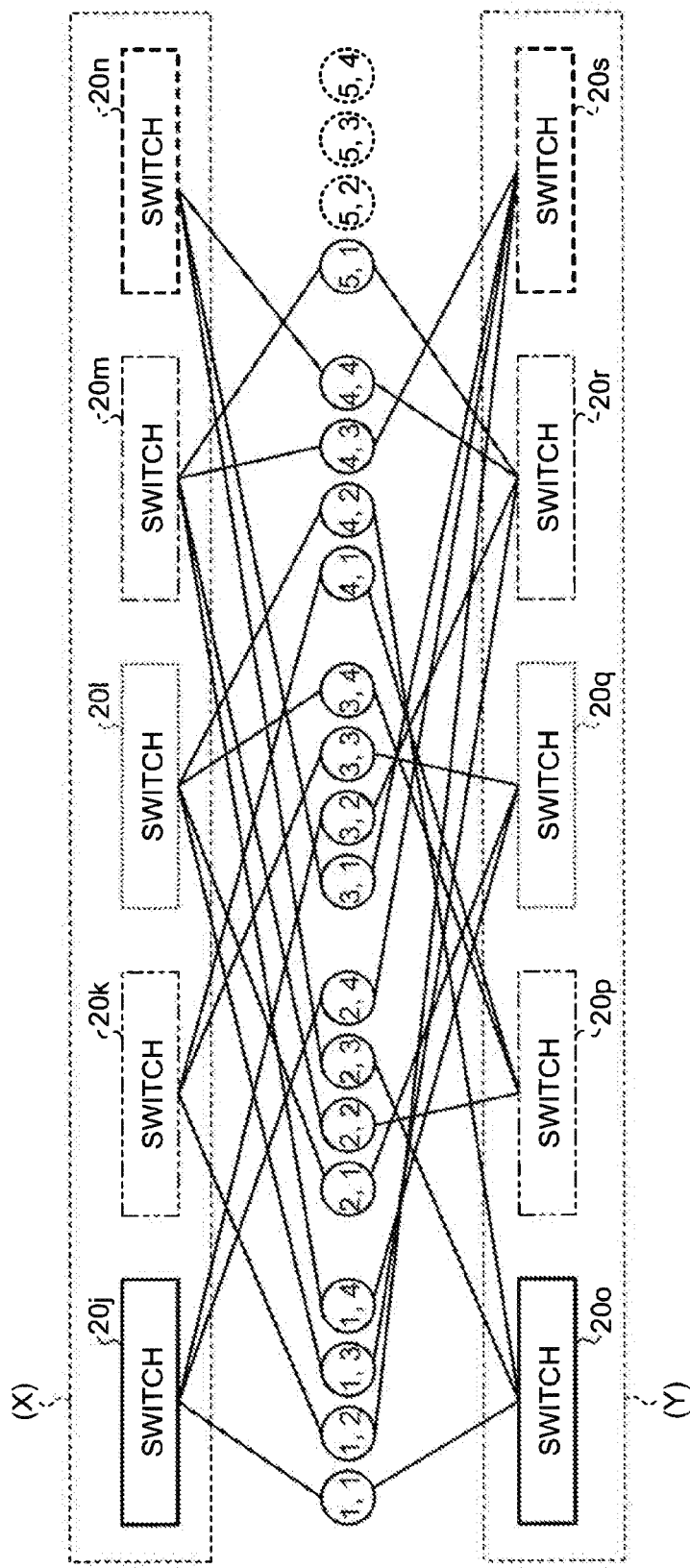
FIG. 9 is a second diagram illustrating an example of connection tables to be output by the design support apparatus according to the first embodiment when the parameters are generalized.

Moreover, as illustrated in (X) of FIG. 9, the design support apparatus 10 describes the connections between the groups of the nodes illustrated in (R) of FIG. 7 and the switches 20j to 20n being the terminating switches included in the second network. The switches 20j to 20n correspond sequentially to the zeroth, third, first, fourth, and second terminating switches.

For example, the design support apparatus 10 generates a connection table indicating that the nodes (1, 1), (2, 4), and (3, 2) are connected to the switch 20j, and the nodes (1, 2), (3, 3), and (4, 1) to the switch 20k. Moreover, the design support apparatus 10 generates a connection table indicating that the nodes (1, 3), (2, 1), (3, 4) and (4, 2) are connected to the switch 20l, and the nodes (1, 4), (2, 2), (4, 3), and (5, 1) to the switch 20m. Moreover, the design support apparatus 10 generates a connection table indicating that the nodes (2, 3), (3, 1), and (4, 4) are connected to the switch 20n.

Moreover, as illustrated in (Y) of FIG. 9, the design support apparatus 10 describes the connections between the groups of the nodes illustrated in (T) of FIG. 7 and switches 20o to 20s being the terminating switches included in the third network. The switches 20o to 20s correspond sequentially to the zeroth, third, first, fourth, and second terminating switches.

For example, the design support apparatus 10 generates a connection table indicating that the nodes (1, 1), (2, 3), and (4, 2) are connected to the switch 20o, and the nodes (2, 2), (3, 4), and (4, 1) to the switch 20p. Moreover, the design support apparatus 10 generates a connection table indicating that the nodes (1, 4), (2, 1), and (3, 3) are connected to the switch 20q, and the nodes (1, 3), (3, 2), (4, 4), and (5, 1) to the switch 20r. Moreover, the design support apparatus 10 generates a connection table indicating that the nodes (1, 2), (3, 1), (2, 4) and (4, 3) are connected to the switch 20s.

As a consequence, when connecting 17 nodes to four networks, the design support apparatus 10 can connect each of the 17 nodes to any of the terminating switches and specify the individually different groups of the nodes as groups of nodes to be connected to the terminating switches, for each network. As a consequence, the design support apparatus 10 can maximize the number of groups of nodes that can perform communication by one hop and accordingly can reduce delay in communication between nodes.

Figure 10:
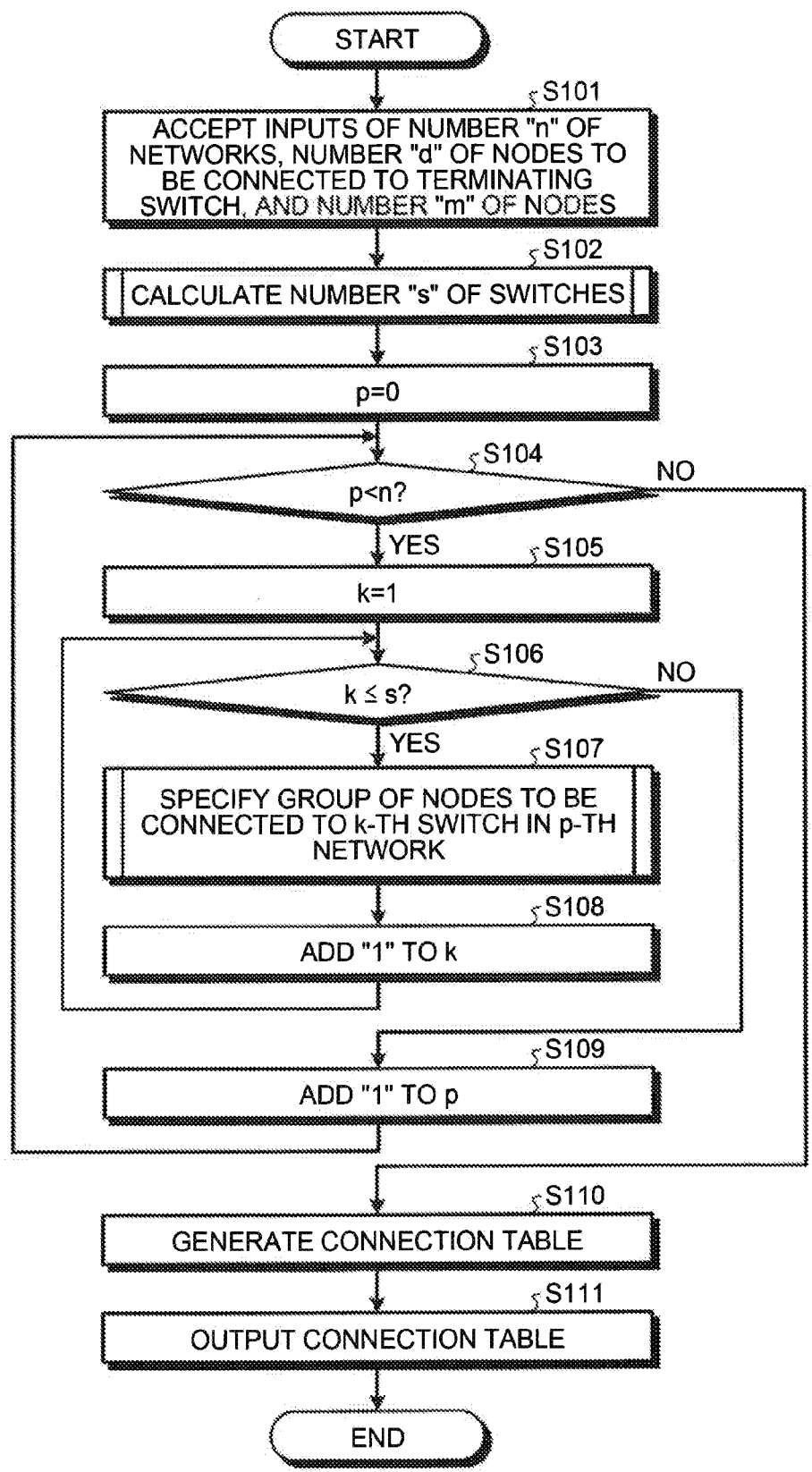
FIG. 10 is a flowchart illustrating the flow of processes to be executed by the design support apparatus according to the first embodiment.

Next, the flow of processes to be executed by the design support apparatus 10 is described with reference to FIG. 10. FIG. 10 is a flowchart illustrating the flow of processes to be executed by the design support apparatus according to the first embodiment. Firstly, the design support apparatus 10 accepts the inputs of the number "n" of networks, the number "d" of nodes to be connected to a terminating switch, and the total number "m" of nodes via the input device 1 (step S101).

Next, the design support apparatus 10 executes a calculation process to calculate the number "s" of switches using the values "d" and "m" (step S102), and initializes the value of a variable p that identify networks to "0" (step S103). Moreover, the design support apparatus 10 determines whether or not the value of p is less than "n" (step S104), and if determining that the value of p is less than "n" (step S104: Yes), sets the value of a variable k that identifies terminating switches to "1" (step S105). The design support apparatus 10 then determines whether or not the value of the variable k is equal to or less than "s" (step S106).

Moreover, if the value of the variable k is equal to or less than "s" (step S106: Yes), the design support apparatus 10 executes a specification process to specify a group of nodes to be connected to the k-th switch in the p-th network (step S107). Next, the design support apparatus 10 adds "1" to the value of the variable k (step S108), and executes step S106.

Moreover, if the value of the variable k is greater than "s" (step S106: No), the design support apparatus 10 adds "1" to the value of the variable p (step S109), and executes step S104. Moreover, if the value of the variable p is equal to or greater than "n" (step S104: No), the design support apparatus 10 generates a connection table indicating the group of nodes specified by the specification process illustrated in step S107 (step S110). The design support apparatus 10 then outputs the generated connection table (step S111), and ends the processing.

Figure 11:
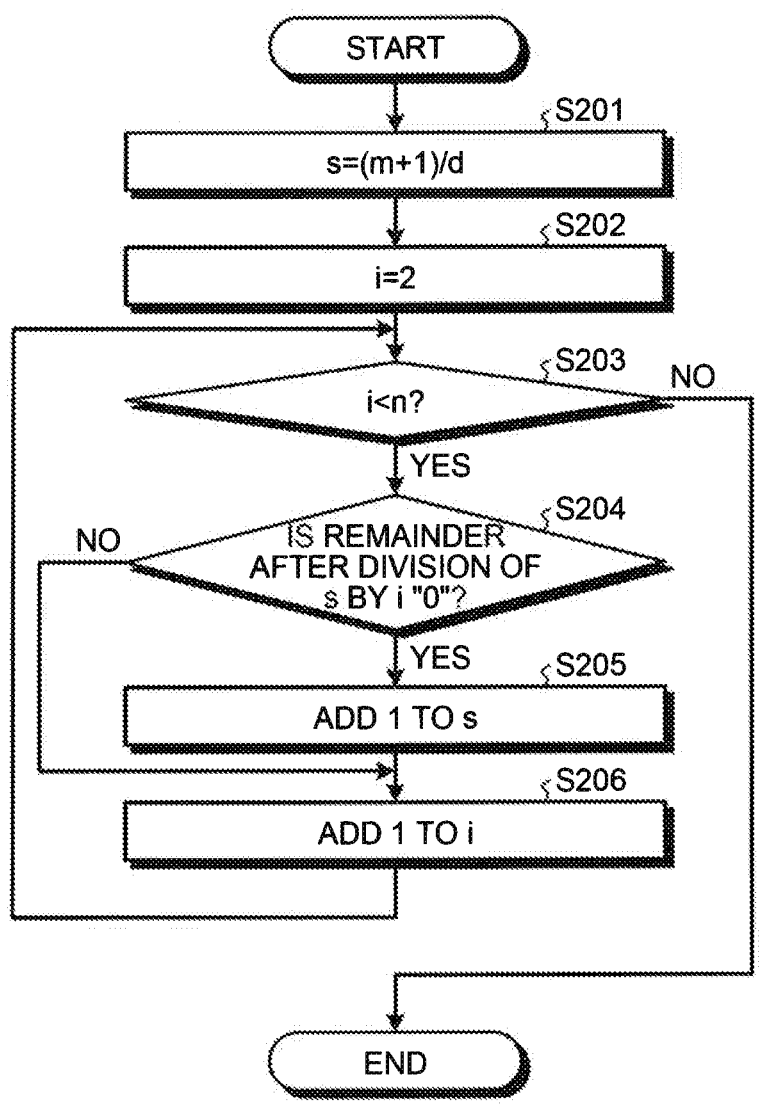
FIG. 11 is a flowchart illustrating the flow of processes where the design support apparatus according to the first embodiment calculates the number of switches.

Next, the flow of the calculation process to be executed by the design support apparatus 10 is described with reference to FIG. 11. FIG. 11 is a flowchart illustrating the flow of processes where the design support apparatus according to the first embodiment calculates the number of switches. The processing illustrated in FIG. 11 is the calculation process described in step S102 in FIG. 10.

Firstly, the design support apparatus 10 sets, as "s", the value obtained by dividing the value obtained by adding "1" to the value of "m" by the value of "d" (step S201), and initializes the value of a variable i to "2" (step S202). Moreover, the design support apparatus 10 determines whether or not the value of the variable i is less than the value of "n" (step S203). If the value of the variable i is less than "n" (step S203: Yes), then the design support apparatus 10 determines whether or not the remainder after division of the value of "s" by the value of the variable i is "0" (step S204).

Moreover, if the remainder after division of the value of "s" by the value of "i" is "0" (step S204: Yes), the design support apparatus 10 adds "1" to the value of "s" (step S205), adds "1" to the value of the variable i (step S206), and executes step S203. If the remainder after division of the value "s" by the value of the variable i is not "0" (step S204: No), the design support apparatus 10 skips execution of step S205, and executes step S206. Moreover, if the value of the variable i is equal to or greater than the value of "n" (step S203: No), the design support apparatus 10 outputs the value of "s", and ends the calculation process.

Figure 12:
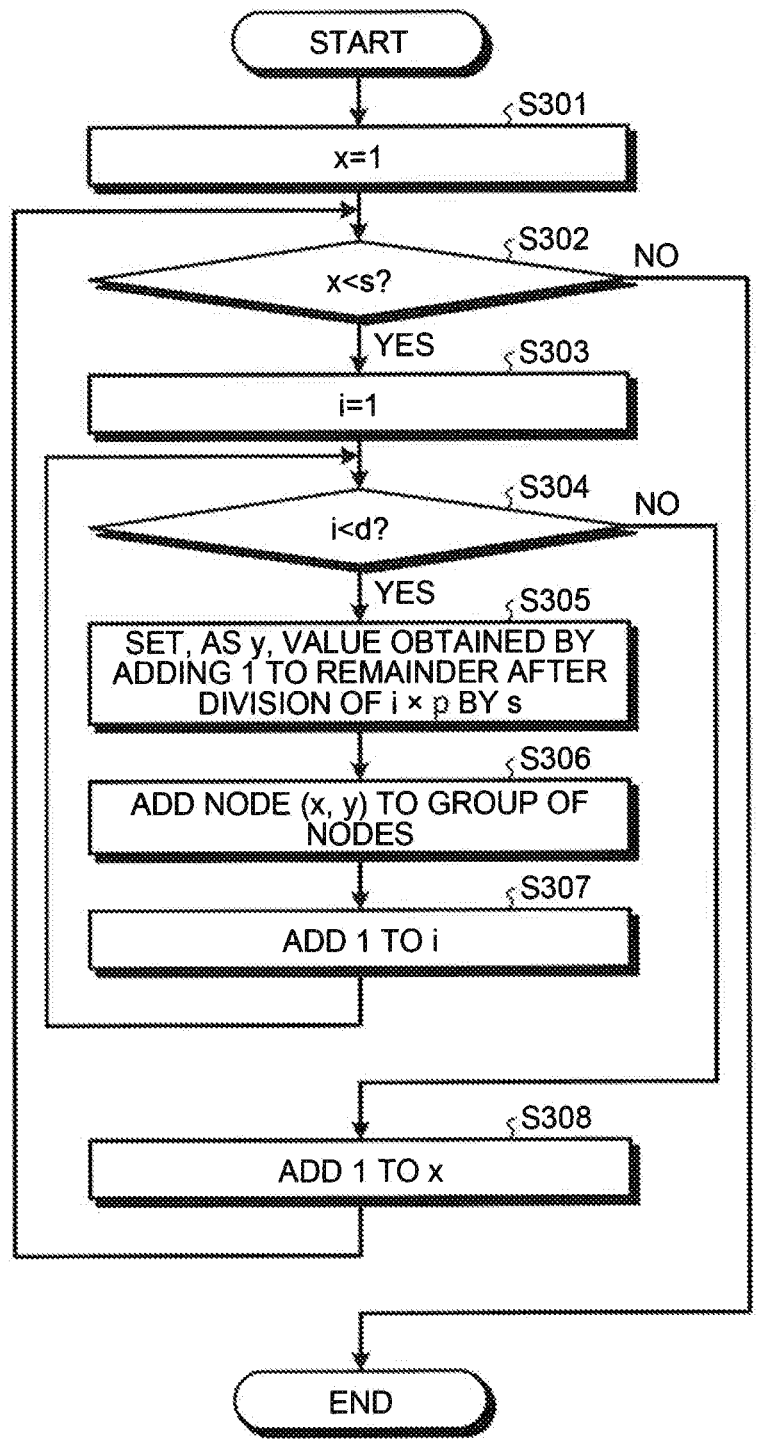
FIG. 12 is a flowchart illustrating the flow of processes where the design support apparatus according to the first embodiment specifies a group of nodes.

Next, the flow of the specification process to be executed by the design support apparatus 10 is described with reference to FIG. 12. FIG. 12 is a flowchart illustrating the flow of processes where the design support apparatus according to the first embodiment specifies a group of nodes. The processing illustrated in FIG. 12 is the specification process described in step S107 in FIG. 10.

Firstly, the design support apparatus 10 initializes the value of a variable x indicating the row number of a number assigned to a node to "1" (step S301), and determines whether or not the value of the variable x is less than the value of "s" (step S302). Moreover, if the value of the variable x is less than the value of "s" (step S302: Yes), the design support apparatus 10 initializes the value of the variable i to "1" (step S303), and determines whether or not the value of the variable i is less than the value of "d" (step S304).

If the value of the variable i is less than the value of "d" (step S304: Yes), then the design support apparatus 10 sets the value obtained by adding 1 to the remainder after division of the product of the value of the variable i and the value of "p" by the value of "s" as a variable "y" indicating the column number of the number assigned to the node (step S305). Moreover, the design support apparatus 10 adds the node to which the number (x, y) has been assigned to a group of nodes (step S306), adds "1" to the value of the variable i (step S307), and executes step S304.

Moreover, if the value of the variable i is equal to or greater than the value of "d" (step S304: No), the design support apparatus 10 adds "1" to the value of the variable x (step S308), and executes step S302. Moreover, if the value of the variable x is equal to or greater than the value of "s" (step S302: No), the design support apparatus 10 ends the specification process.

Effect of Design Support Apparatus 10

As described above, the design support apparatus 10 accepts the inputs of the number "m" of nodes to be connected to a network, the number "n" of networks to be connected to each node, and the number "d" of nodes to be connected to a terminating switch. Moreover, the design support apparatus 10 calculates the number "s" of terminating switches to be connected to nodes in each network from the values of the number "m" of nodes, the number "n" of networks, and the number "d" of nodes to be connected to a terminating switch.

The design support apparatus 10 then specifies nodes to be connected to each terminating switch such that each node is connected to any of "s" terminating switches included in each network, and that groups of the nodes to be connected to the terminating switches included in all the networks are different from each other. The design support apparatus 10 subsequently outputs connection information to the effect that the specified nodes are connected to the terminating switches.

Hence, the design support apparatus 10 can increase the number of groups of nodes that can perform communication by one hop and accordingly can reduce delay in communication between nodes when each node is connected to a plurality of networks.

Moreover, if the accepted number of networks is "2", the design support apparatus 10 calculates, as the number "s" of switches, an integer of a minimum value among integers greater than the value obtained by dividing the number "m" of nodes by the number "d" of nodes to be connected to one terminating switch. Moreover, the design support apparatus 10 assigns, to "m" nodes, numbers of a matrix form in which the number "d" of nodes to be connected to one terminating switch is set to the number of elements in each row, and the number "s" of terminating switches is set as the number of elements in each column.

The design support apparatus 10 then specifies a group of nodes to which the same row number has been assigned, as a group of nodes to be connected to each terminating switch included in a first network. Moreover, the design support apparatus 10 specifies a group of nodes to which numbers have been assigned in which the row numbers and the column numbers are different by one, as a group of nodes to be connected to each terminating switch included in a second network. In other words, the design support apparatus 10 specifies a group of nodes to which numbers have been assigned in which the column numbers are different by one whenever the row numbers are different by one. Hence, the design support apparatus 10 can increase the number of groups of nodes that can perform communication by one hop when connecting two networks to each node. As a consequence, the design support apparatus 10 can reduce delay in communication between nodes.

Moreover, the design support apparatus 10 calculates, as the number "s" of switches, a minimum integer indivisible by any integer equal to or less than the accepted number of networks among integers greater than the value obtained by dividing the number "m" of nodes by the number "d" of nodes to be connected to one terminating switch. Moreover, the design support apparatus 10 assigns integer numbers starting with 0 to the accepted number of networks. The design support apparatus 10 then executes the following process for each network. In other words, the design support apparatus 10 specifies a group of nodes to which numbers have been assigned in which the row numbers are different by the same value as an integer number assigned to a network whenever the column numbers are different by one, as a group of nodes to be connected to each terminating switch included in the network.

Hence, when a given number of networks is connected to a plurality of nodes, the design support apparatus 10 can specify individually different groups of nodes, as groups of nodes to be connected to the terminating switches included in each network. As a consequence, when the given number of networks is connected to each node, the design support apparatus 10 can increase the number of groups of nodes that can perform communication by one hop and accordingly can reduce delay in communication between nodes.

[b] Second Embodiment

The above-mentioned design support apparatus 10 calculates a number assigned to a node to be connected to each terminating switch from the input values of the various parameters and accordingly connects each node to all networks, and connects a different group of nodes to each terminating switch. However, the embodiment is not limited to this. Hereinafter, a description is given of a design support apparatus 10a as a second embodiment, the design support apparatus 10a specifying a group of nodes to be connected to each terminating switch using mutually orthogonal Latin squares. In the following description, the same reference numerals are assigned to devices and functional configurations that exhibit similar functions to those of the first embodiment. Their descriptions are omitted.

Figure 13:
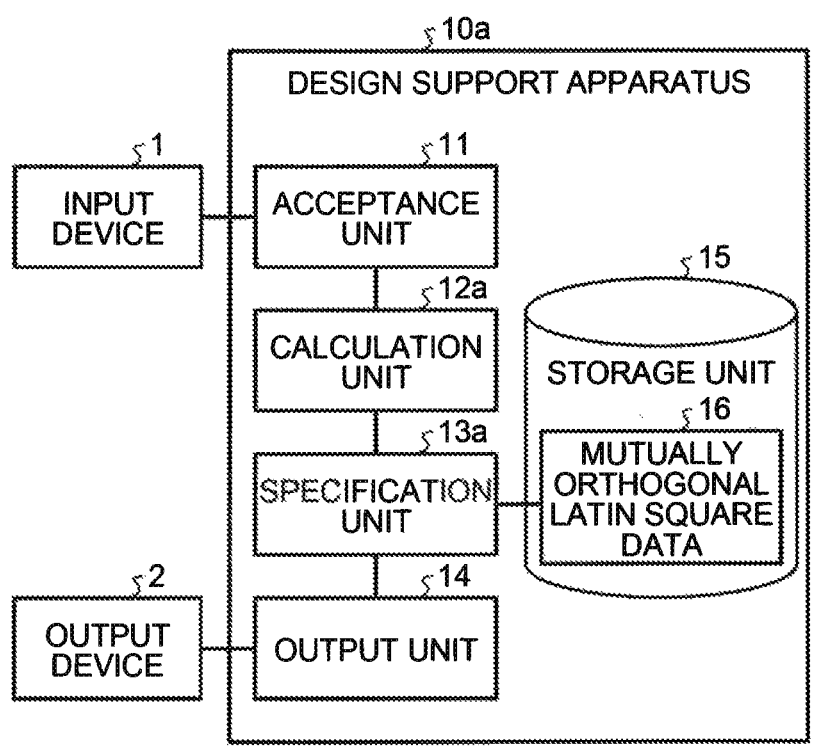
FIG. 13 is a diagram illustrating a functional configuration of a design support apparatus according to a second embodiment.

FIG. 13 is a diagram illustrating a functional configuration of the design support apparatus according to the second embodiment. As illustrated in FIG. 13, the design support apparatus 10a includes the acceptance unit 11, a calculation unit 12a, a specification unit 13a, the output unit 14, and a storage unit 15. Moreover, mutually orthogonal Latin square data 16 is stored in the storage unit 15.

The mutually orthogonal Latin square data 16 is data containing a plurality of mutually orthogonal Latin squares. Hereinafter, a description is given of the mutually orthogonal Latin squares contained in the mutually orthogonal Latin square data 16. For example, a Latin square is a square matrix of q rows and q columns with a given integer q, and an array including integer values from 1 to q as elements. Moreover, a Latin square is a matrix where any row and column do not contain the same integer value. Hence, each of the integer values from 1 to q occurs once in any row and column of a Latin square.

Moreover, among Latin squares, a mutually orthogonal Latin square is a Latin square in which each individual column has a different order of elements. For example, a Latin square in which a certain column contains elements of (1, 2, 3, 4) is not a mutually orthogonal Latin square if there is a column containing elements of (2, 3, 4, 1), (3, 4, 1, 2), or (4, 1, 2, 3). Moreover, in a case of a mutually orthogonal Latin square of q rows and q columns, if the value of q is a prime number or a power of a prime number, there are q−1 mutually orthogonal Latin squares, which can be constructed by calculation with, for example, the crossdes package of the statistical process software R.

The design support apparatus 10a selects a different mutually orthogonal Latin square for each network. The design support apparatus 10a then associates nodes with elements contained in the selected mutually orthogonal Latin square, and specifies a group of nodes associated with the elements having the same value as a group of nodes to be connected to one terminating switch. As a consequence, due to the above-mentioned nature of the mutually orthogonal Latin square, the design support apparatus 10a specifies individually different groups of nodes as groups of nodes to be connected to the terminating switches. As a consequence, the design support apparatus 10a can specify individually different groups of nodes as the groups of nodes to be connected to the terminating switches by simply referring to the elements contained in the mutually orthogonal Latin square.

Figure 14:
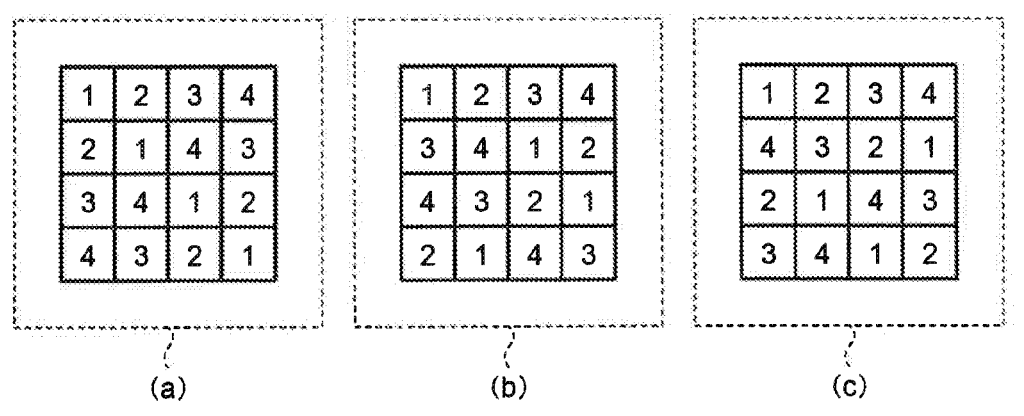

Hereinafter, a description is given of examples of mutually orthogonal Latin squares contained in the mutually orthogonal Latin square data 16 with reference to FIG. 14. FIG. 14 is a diagram illustrating examples of the mutually orthogonal Latin square data stored in the design support apparatus according to the second embodiment. FIG. 14 describes examples of mutually orthogonal Latin squares being square matrices of 4 rows and 4 columns.

For example, as illustrated in (a) of FIG. 14, a first mutually orthogonal Latin square contains elements (1, 2, 3, 4) in the first row, elements (2, 1, 4, 3) in the second row, (3, 4, 1, 2) in the third row, and elements (4, 3, 2, 1) in the fourth row. Moreover, as illustrated in (b) of FIG. 14, a second mutually orthogonal Latin square contains elements (1, 2, 3, 4) in the first row, elements (3, 4, 1, 2) in the second row, (4, 3, 2, 1) in the third row, and elements (2, 1, 4, 3) in the fourth row. Moreover, as illustrated in (c) of FIG. 14, a third mutually orthogonal Latin square contains elements (1, 2, 3, 4) in the first row, elements (4, 3, 2, 1) in the second row, (2, 1, 4, 3) in the third row, and elements (3, 4, 1, 2) in the fourth row.

The mutually orthogonal Latin squares illustrated in FIG. 14 are merely examples. It is assumed that in addition to them, the mutually orthogonal Latin square data 16 contains mutually orthogonal Latin squares of 3×3, 5×5, 7×7, 8×8, 9×9, and 11×11.

Returning to FIG. 13, the description is continued. The calculation unit 12a uses the values of the various parameters "m", "n", and "d" from the acceptance unit 11 to calculate the number of terminating switches of each network. In detail, the calculation unit 12a calculates a minimum integer among integers greater than the value obtained by dividing "m" by the value of "d", the integers having values that are indivisible by any integer equal to or less than "n" other than 1 and that are powers of prime numbers. For example, the calculation unit 12a calculates "m/d=4" if "m=12," "d=3," and "n=4."

A minimum integer indivisible by "2", "3", and "4" among integers equal to or greater than "4" calculated by the calculation unit 12a is "5". On the other hand, a minimum integer that is a power of a prime number among integers equal to or greater than "4" calculated by the calculation unit 12a is "4". Hence, the calculation unit 12a calculates, as the number "s" of switches, the integer "4" that is smaller in value between the minimum integer "5" indivisible by "2", "3", and "4" among the integers greater than "4" and the minimum integer "4" being the power of a prime number.

The calculation unit 12a subsequently outputs, to the specification unit 13a, the values of the various parameters "m", "n", and "d" and the calculated number "s" of switches. Moreover, the calculation unit 12a notifies the specification unit 13a that the number of switches is a power of a prime number if the calculated number "s" of switches is a power of a prime number, and notifies the specification unit 13a that the number of switches is a power of a prime number if "s" is not a power of a prime number.

The specification unit 13a specifies a group of nodes to be connected to each terminating switch. Specifically, the specification unit 13a receives, from the calculation unit 12a, the values of the parameters "m", "n", and "d", and the calculated number "s" of switches. Moreover, the specification unit 13a receives, from the calculation unit 12a, a notification whether or not the number "s" of switches is a power of a prime number.

If having received a notification to the effect that the number "s" of switches is not a power of a prime number, then the specification unit 13a then executes similar processes to those of the specification unit 13 illustrated in FIG. 1 and accordingly specifies a group of nodes to be connected to each terminating switch and outputs the specified groups of nodes to the output unit 14.

On the other hand, the specification unit 13a executes the following process if having received a notification to the effect that the number "s" of switches is a power of a prime number. Firstly, the specification unit 13a assigns, to "m"

nodes, numbers of a matrix form in which the number "d" of nodes to be connected to a terminating switch is set as the number of elements in each row, and the number "s" of terminating switches is set as the number of elements in each column. Moreover, the specification unit 13a assigns integer numbers from 1 to S to "s" terminating switches included in each network. Moreover, the specification unit 13a extracts "n" mutually orthogonal Latin squares of s rows and s columns from the mutually orthogonal Latin square data 16, and associates the acquired mutually orthogonal Latin squares with "n" networks.

The specification unit 13a then executes the following process for each network. For example, if specifying a group of nodes to be connected to the k-th terminating switch, the specification unit 13a extracts elements having a value of "k" among elements contained in the associated mutually orthogonal Latin square. The specification unit 13a then specifies nodes to which the same row and column numbers as the extracted element have been assigned, as a group of nodes to be connected to the terminating switch.

Figure 15:
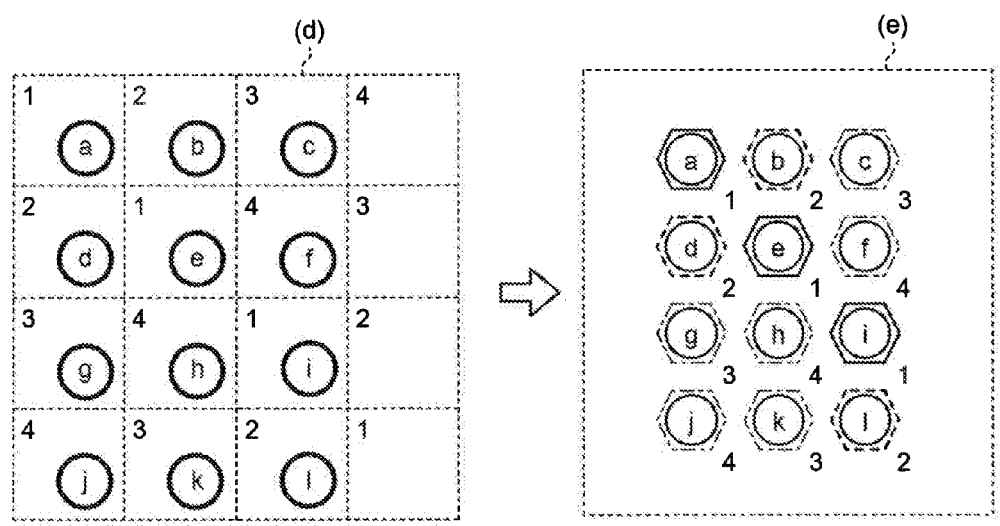
FIG. 15 is a diagram illustrating an example of a network to be designed by the design support apparatus according to the second embodiment using a mutually orthogonal Latin square.

Hereinafter, an example of a process to be executed by the specification unit 13a is described. In the following description, a description is given of an example of a process to be executed by the specification unit 13a if "m=12", "n=4," and "d=3." For example, FIG. 15 is a diagram illustrating an example of a network to be designed by the design support apparatus according to the second embodiment using a mutually orthogonal Latin square. For example, the specification unit 13a assigns numbers of a matrix form to the nodes a to l and accordingly associates elements in a mutually orthogonal Latin square illustrated in (d) of FIG. 15 with the nodes a to l.

The specification unit 13a then specifies the nodes a, e, and i associated with the elements having a value of "1" among the elements in the mutually orthogonal Latin Square illustrated in (d) of FIG. 15, as a group of nodes to be connected to a first terminating switch. Moreover, the specification unit 13a the nodes b, d, and l associated with the elements having a value of "2" as a group of nodes to be connected to a second terminating switch.

Moreover, the specification unit 13a specifies the nodes c, g, and k associated with the elements having a value of "3" as a group of nodes to be connected to a third terminating switch. Moreover, the specification unit 13a specifies the nodes f, h, and j associated with the elements having a value of "4" as a group of nodes to be connected to a fourth terminating switch. As a consequence, as illustrated in (e) of FIG. 15, the specification unit 13a specifies the groups of the nodes to be connected to the first to fourth terminating switches.

Moreover, the specification unit 13a uses a different mutually orthogonal Latin square for each network to execute the above-mentioned process, and specifies a group of nodes to be connected to each terminating switch. In detail, the specification unit 13a specifies a group of nodes having the same row number as a group of nodes to be connected to each terminating switch included in a zeroth network, similarly to the specification unit 13. Next, the specification unit 13a uses the mutually orthogonal Latin square illustrated in (a) of FIG. 14 to specify groups of nodes to be connected to terminating switches included in a first network.

Moreover, the specification unit 13a uses the mutually orthogonal Latin square illustrated in (b) of FIG. 14 to specify groups of nodes to be connected to terminating switches included in a second network. Moreover, the specification unit 13a uses the mutually orthogonal Latin square illustrated in (c) of FIG. 14 to specify groups of nodes to be connected to terminating switches included in a third network. As a consequence, for example, the specification unit 13a specifies the groups of nodes illustrated in FIG. 16 as groups of nodes to be connected to the terminating switches.

FIG. 16 is a diagram illustrating examples of networks to be designed by the design support apparatus according to the second embodiment. (f) of FIG. 16 illustrates the groups of the nodes specified for the zeroth network, and (g) of FIG. 16 illustrates the groups of the nodes specified for the first network, using the mutually orthogonal Latin squares illustrated in (a) of FIG. 14. Moreover, (h) of FIG. 16 illustrates the groups of the nodes specified for the second network, using the mutually orthogonal Latin square illustrated in (b) of FIG. 14. Moreover, (i) of FIG. 16 illustrates the groups of the nodes specified for the third network, using the mutually orthogonal Latin square illustrated in (c) of FIG. 14.

For example, as illustrated in (f) of FIG. 16, the specification unit 13a specifies groups of the nodes a to c, the nodes d to f, the nodes g to i, and the nodes j to l, as the groups of the nodes to be connected to the terminating switches included in the zeroth network. Moreover, as illustrated in (g) of FIG. 16, the specification unit 13a specifies groups of nodes to be connected to the terminating switches included in the first network. In detail, the specification unit 13a specifies a group of the nodes a, e, and i as indicated by hexagons in solid lines, and specifies a group of the nodes d, b, and l as indicated by hexagons in dotted lines. Moreover, the specification unit 13a specifies a group of the nodes g, k, and c as indicated by hexagons in one-dot broken lines, and specifies a group of the nodes j, h, and f as indicated by hexagons in two-dot broken lines.

Moreover, as illustrated in (h) of FIG. 16, the specification unit 13a specifies groups of nodes to be connected to the terminating switches included in the second network. In detail, the specification unit 13a specifies a group of the nodes a, k, and f as indicated by hexagons in solid lines, and specifies a group of the nodes j, b, and i as indicated by hexagons in dotted lines. Moreover, the specification unit 13a specifies a group of the nodes d, h, and c as indicated by hexagons in one-dot broken lines, and specifies a group of the nodes g, e, and l as indicated by hexagons in two-dot broken lines.

Moreover, as illustrated in (i) of FIG. 16, the specification unit 13a specifies groups of nodes to be connected to the terminating switches included in the third network. In detail, the specification unit 13a specifies a group of the nodes a, h, and l as indicated by hexagons in solid lines, and specifies a group of the nodes g, b, and f as indicated by hexagons in dotted lines. Moreover, the specification unit 13a specifies a group of the nodes j, e, and c as indicated by hexagons in one-dot broken lines, and specifies a group of the nodes d, k, and i as indicated by hexagons in two-dot broken lines.

Figure 17:
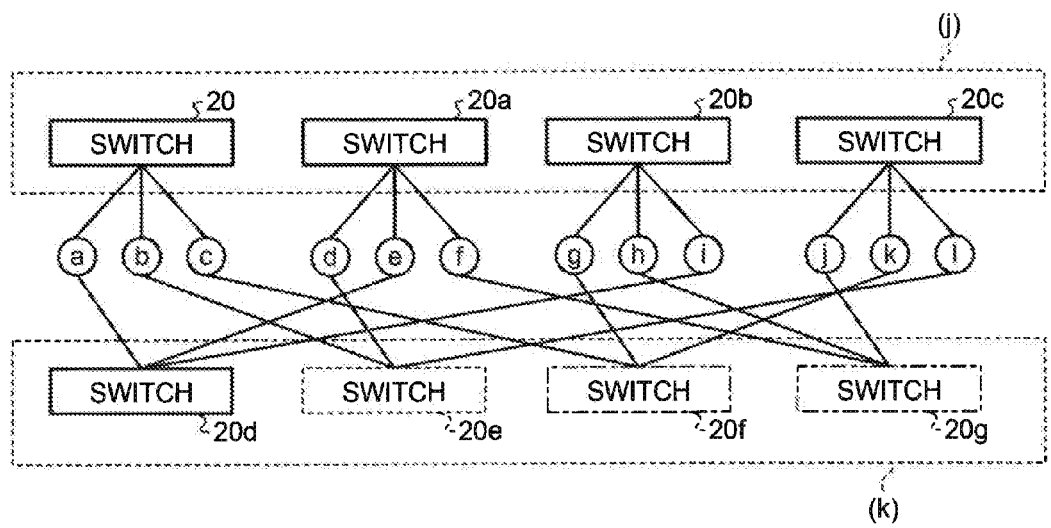
FIG. 17 is a first diagram illustrating examples of connection tables to be output by the design support apparatus according to the second embodiment.
Figure 18:
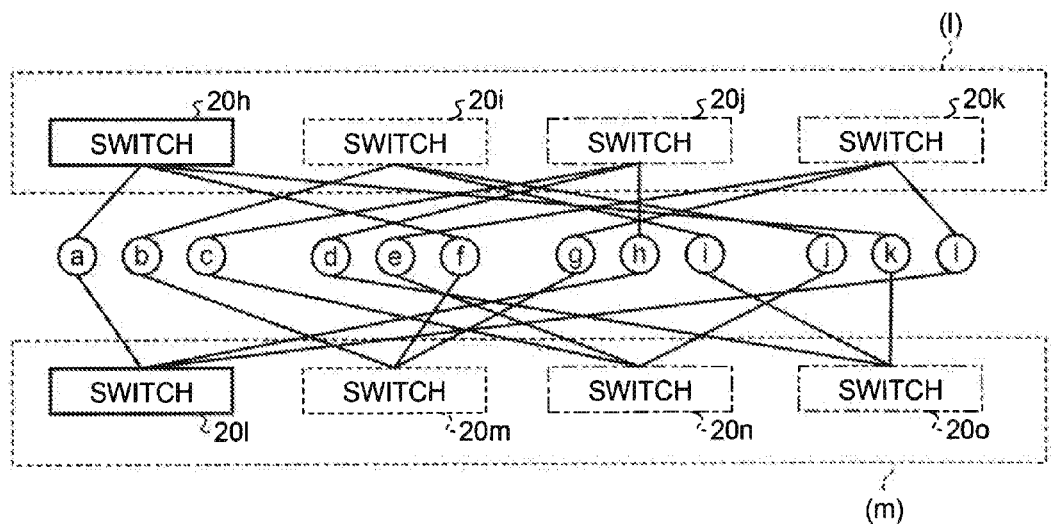
FIG. 18 is a second diagram illustrating examples of connection tables to be output by the design support apparatus according to the second embodiment.

As a consequence, the design support apparatus 10a outputs the connections tables illustrated in FIGS. 17 and 18. FIG. 17 is a first diagram illustrating examples of connection tables to be output by the design support apparatus according to the second embodiment. Moreover, FIG. 18 is a second diagram illustrating examples of connection tables to be output by the design support apparatus according to the second embodiment. For example, as illustrated in (j) of FIG. 17, the design support apparatus 10a outputs a connection table indicating that the groups of the nodes a to c, the nodes d to f, the nodes g to i, and the nodes j to l are connected to the switches 20 and 20a to 20c being the terminating switches included in the zeroth network.

Moreover, as illustrated in (k) of FIG. 17, the design support apparatus 10a outputs a connection table indicating that the specified groups of the nodes are connected to the switches 20d to 20g being the terminating switches included in the first network. In detail, the design support apparatus 10a outputs a connection table indicating that the nodes a, e, and i are connected to the switch 20d, the nodes b, d, and l to the switch 20e, and the nodes c, g, and k to the switch 20f.

Moreover, the design support apparatus 10a outputs a connection table indicating the nodes f, j, and h are connected to the switch 20g.

Moreover, as illustrated in (l) of FIG. 18, the design support apparatus 10a outputs a connection table indicating that the specified groups of the nodes are connected to the switches 20h to 20k being terminating switches included in the second network. In detail, the design support apparatus 10a outputs a connection table indicating that the nodes a, f, and k are connected to the switch 20h, the nodes b, i, and j to the switch 20i, and the nodes c, d, and h to the switch 20j. Moreover, the design support apparatus 10a outputs a connection table indicating the nodes e, g, and l are connected to the switch 20k.

Moreover, as illustrated in (m) of FIG. 18, the design support apparatus 10a outputs a connection table indicating that the specified groups of the nodes are connected to switches 20l to 20o being terminating switches included in the third network. In detail, the design support apparatus 10a outputs a connection table indicating that the nodes a, h, and 1 are connected to the switch 20l, the nodes b, f, and g to the switch 20m, and the nodes c, e, and j to the switch 20n. Moreover, the design support apparatus 10a outputs a connection table indicating the nodes d, i, and k are connected to the switch 20o.

In this manner, the design support apparatus 10a can specify individually different groups of nodes as groups of nodes to be connected to terminating switches, using the mutually orthogonal Latin squares stored in the storage unit 15. As a consequence, the design support apparatus 10a can easily specify a group of nodes to be connected to each terminating switch.

The design support apparatus 10a may calculate a mutually orthogonal Latin square whenever specifying a group of nodes. For example, the design support apparatus 10a may calculate the number "s" of switches, and, if the calculated number "s" of switches is a power of a prime number, calculate a mutually orthogonal Latin square in which the numbers of elements in the row and column directions are "s", and specify groups of nodes to be connected to terminating switches using the calculated mutually orthogonal Latin square.

Next, the flow of processes to be executed by the design support apparatus 10a is described with reference to FIGS. 19 to 21. It is assumed that the design support apparatus 10a executes similar processes to those illustrated in FIG. 10 to specify a group of nodes to be connected to a terminating switch. In the following description, a description is given of the flows of the calculation process illustrated in step S102 and the specification process illustrated in step S107 in FIG. 10 among the processes to be executed by the design support apparatus 10a.

The flow of the calculation process to be executed by the design support apparatus 10a is described with reference to FIG. 19. FIG. 19 is a flowchart illustrating the flow of processes where the design support apparatus according to the second embodiment calculates the number of switches. The same reference numerals are assigned to similar processes to those illustrated in FIG. 11 among the processes illustrated in FIG. 19. Their descriptions are omitted.

Figure 19:
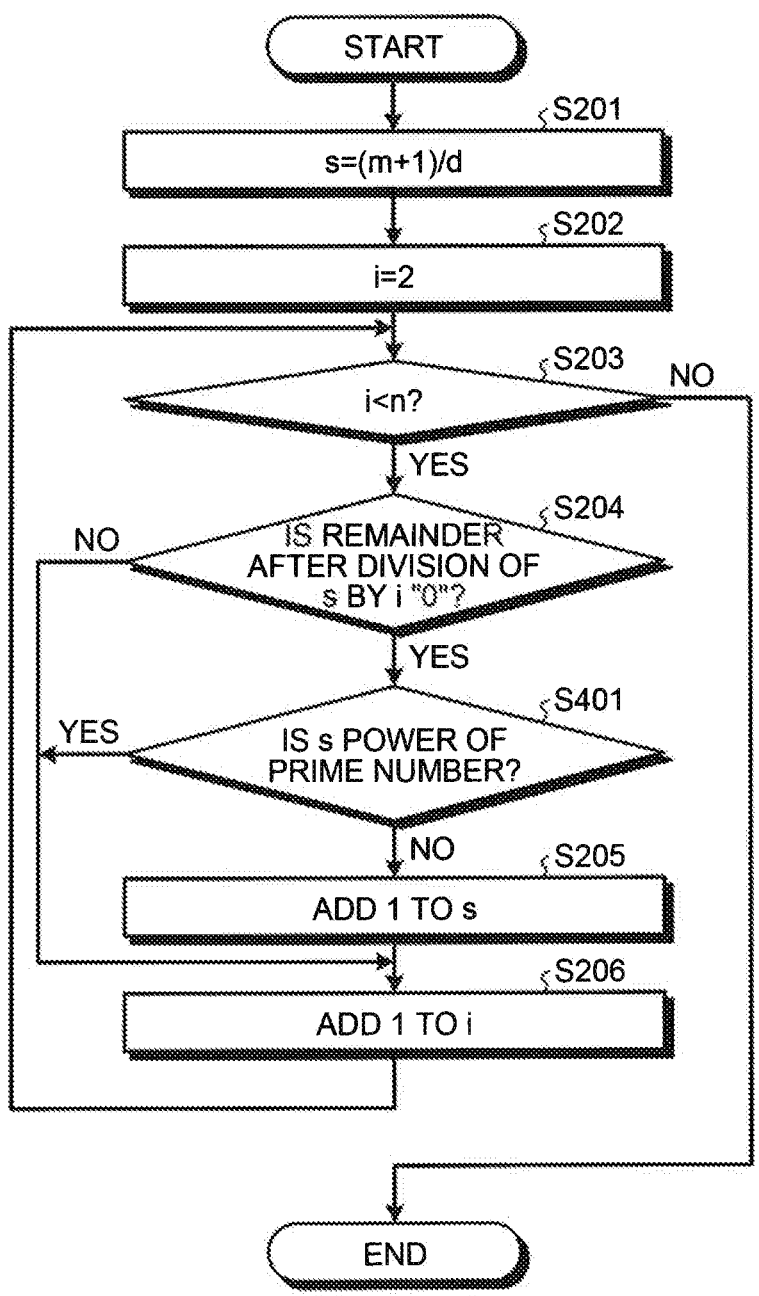
FIG. 19 is a flowchart illustrating the flow of processes where the design support apparatus according to the second embodiment calculates the number of switches.
Figure 20:
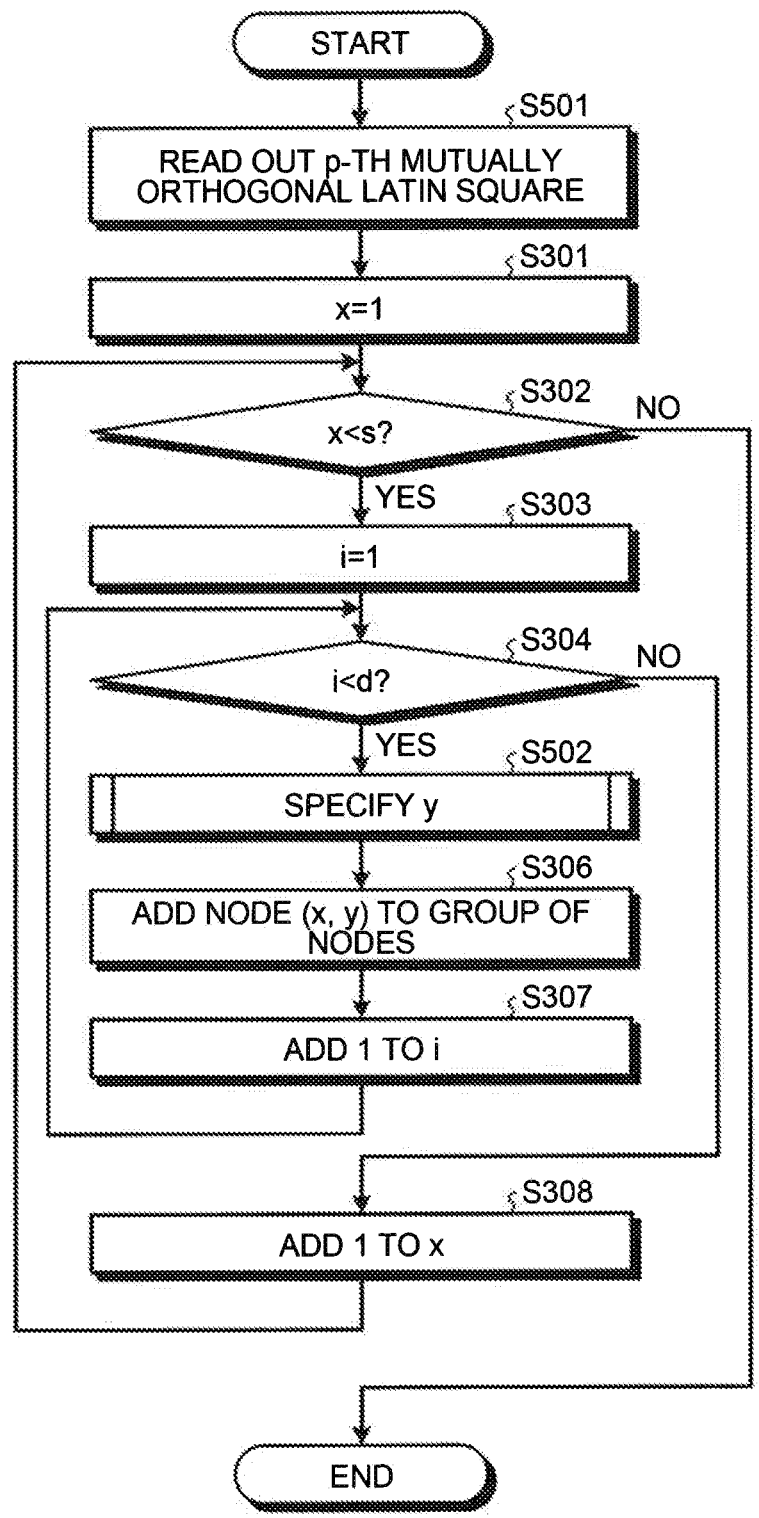
FIG. 20 is a flowchart illustrating the flow of processes where the design support apparatus according to the second embodiment specifies a group of nodes.

For example, as illustrated in FIG. 19, the design support apparatus 10a executes a process illustrated in step S401 between the processes of steps S204 and S205 illustrated in FIG. 11. In detail, if the remainder after division of the value of "s" by the value of "i" is "0" (step S204: Yes), the design support apparatus 10a determines whether or not the value of "s" is a power of a prime number (step S401). If the value of "s" is not a power of a prime number (step S401: No), then the design support apparatus 10a executes step S205.

On the other hand, if the value of "s" is a power of a prime number (step S401: Yes), then the design support apparatus 10a skips execution of step S205 and executes step S206.

Next, the flow of the specification process to be executed by the design support apparatus 10a is described with reference to FIG. 20. FIG. 20 is a flowchart illustrating the flow of processes where the design support apparatus according to the second embodiment specifies a group of nodes. The same reference numerals are assigned to similar processes to those illustrated in FIG. 12 among the processes illustrated in FIG. 20. Their descriptions are omitted. Moreover, FIG. 21 describes processes to specify nodes to be connected to the k-th terminating switch among terminating switches included in the p-th network.

For example, the design support apparatus 10a executes a process illustrated in step S501 prior to the process of step S301 illustrated in FIG. 12 and executes a process illustrated in step S502 instead of the process of step S305. In detail, if specifying a group of nodes to be connected to the terminating switch included in the p-th network, the design support apparatus 10a reads out a p-th mutually orthogonal Latin square among the mutually orthogonal Latin squares stored in the mutually orthogonal Latin square data 16 (step S501). It is assumed that the value of p is a value other than 0.

The design support apparatus 10a then executes step S304, and, if the value of the variable "i" is less than the value of "d" (step S304: Yes), specifies the value of the variable "y" using the mutually orthogonal Latin square read out in step S501 (step S502). The design support apparatus 10a then adds the node to which the number (x, y) has been assigned, to the group of nodes (step S306).

Figure 21:
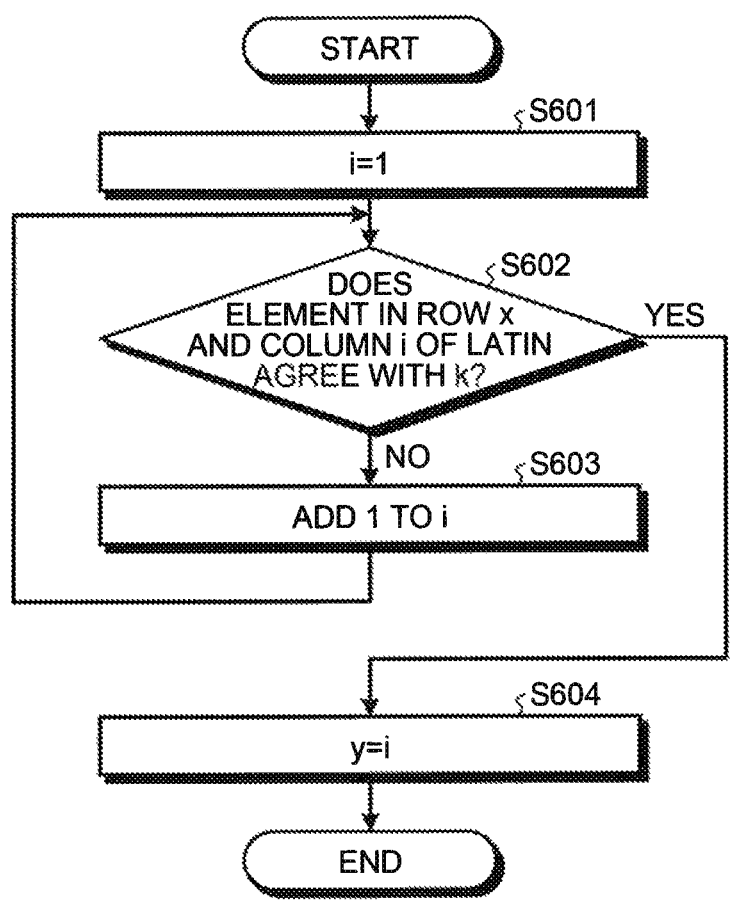
FIG. 21 is a flowchart illustrating the flow of processes where the design support apparatus according to the second embodiment specifies the value of y.

Next, a description is given of the flow of processes where the design support apparatus 10a specifies the value of the variable "y" using the mutually orthogonal Latin square with reference to FIG. 21. FIG. 21 is a flowchart illustrating the flow of processes where the design support apparatus according to the second embodiment specifies the value of y. FIG. 21 describes in detail the processes to specify the value of "y" described in step S502 in FIG. 20.

For example, the design support apparatus 10a initializes the value of the variable "i" to "1" (step S601). The design support apparatus 10a then determines whether or not an element in row "x" and column "i" agrees with the value of a terminating switch number of "k" in the mutually orthogonal Latin square read out in step S501 in FIG. 20 (step S602). If the element in row "x" and column "i" does not agree with the value of the terminating switch number of "k" (step S602: No), then the design support apparatus 10a adds "1" to the value of "i" (step S603), and executes step S602. Moreover, if the element in row "x" and column "i" agrees with the value of the terminating switch number of "k" (step S602: Yes), the design support apparatus 10a sets the value of "y" as "i" (step S604), and ends the processing.

Effect of Design Support Apparatus 10a

As described above, the design support apparatus 10a calculates, as the number "s" of terminating switches included in each network, a minimum integer among integers that are equal to or greater than "m/d", are equal to or less than "n" other than 1, are powers of prime numbers. Moreover, if the value of the number "s" of terminating switches is a power of a prime number, the design support apparatus 10a associates individually different mutually orthogonal Latin squares with networks, respectively.

The design support apparatus 10a then executes the following process for each network. In other words, the design support apparatus 10a extracts elements having the same value among elements of the associated mutually orthogonal Latin square, and specifies a group of nodes to which the same row and column numbers as the extracted element have been assigned, as a group of nodes to be connected to the same terminating switch.

In this manner, the design support apparatus 10a uses a mutually orthogonal Latin square to specify groups of nodes to be connected to terminating switches. Hence, the design support apparatus 10a can easily specify individually different groups of nodes, as groups of nodes to be connected to terminating switches, in all networks.

Moreover, the design support apparatus 10a stores a mutually orthogonal Latin square in which the number of rows is a power of a prime number. If the value of the number "s" of terminating switches is a power of a prime number, then the design support apparatus 10a uses a mutually orthogonal Latin square in which the number of rows is the same as the number "s" of terminating switches among the stored mutually orthogonal Latin squares, and specifies a group of nodes to be connected to each terminating switch. Hence, the design support apparatus 10a can easily specify individually different groups of nodes.

[c] Third Embodiment

Up to this point the embodiments of the present invention have been described. However, embodiments can be carried out in variously different modes other than the above-mentioned embodiments. Hence, in the following, another embodiment included in the present invention is described as a third embodiment.

(1) Regarding the Design Support Apparatuses 10 and 10a

The functions to be exhibited by the above-mentioned design support apparatuses 10 and 10a can be freely combined and implemented. For example, the design support apparatus 10a may specify nodes using a mutually orthogonal Latin square, or specify nodes using similar processes to those of the design support apparatus 10, in accordance with the instruction of a user. Moreover, also if the number of networks is "2", the design support apparatus 10 can specify a different group of nodes for each terminating switch by executing similar processes to those of the case where the number of networks is "3".

(2) Regarding the Design of Networks

The above-mentioned design support apparatuses 10 and 10a generate a connection table indicating the connection relationship between a terminating switch and nodes, and outputs the generated connection table. However, the embodiment is not limited to this. For example, the design support apparatuses 10 and 10a may design a network to connect terminating switches together, and output a connection table indicating the designed network together. Moreover, the design support apparatuses 10 and 10a may instruct a user to freely establish connection without designing a network to connect terminating switches.

(3) Regarding Parameters

The above-mentioned design support apparatuses 10 and 10a accept the number "d" of nodes to be connected to a terminating switch, as a parameter. However, the embodiment is not limited to this. For example, the design support apparatuses 10 and 10a accept the number "e" of ports included in a terminating switch. In such a case, the design support apparatuses 10 and 10a may calculate, as "d", the value obtained by subtracting a predetermined number, in other words, the number of ports to connect a terminating switch and a switch connecting terminating switches from the accepted value of "e".

(4) Regarding Mutually Orthogonal Latin Squares

The above-mentioned design support apparatus 10a uses the mutually orthogonal Latin square data 16 stored in the storage unit 15 to specify a group of nodes to be connected to each terminating switch. However, the embodiment is not limited to this. For example, the design support apparatus 10a may calculate a mutually orthogonal Latin square in which the number "s" of terminating switches is the number of elements in the row or column direction whenever specifying a group of nodes, and use the calculated mutually orthogonal Latin square to specify a group of nodes.

Moreover, the design support apparatus 10a may execute the following process. For example, when calculating the number "s" of terminating switches, the design support apparatus 10a determines whether or not a mutually orthogonal Latin square of s rows and s columns is contained in the mutually orthogonal Latin square data 16. If a mutually orthogonal Latin square of s rows and s columns is contained in the mutually orthogonal Latin square data 16, then the design support apparatus 10a uses the mutually orthogonal Latin square of s rows and s columns contained in the mutually orthogonal Latin square data 16 to specify groups of nodes.

On the other hand, if a mutually orthogonal Latin square of s rows and s columns is not contained in the mutually orthogonal Latin square data 16, the design support apparatus 10a calculates a mutually orthogonal Latin square of s rows and s columns and uses the calculated mutually orthogonal Latin square to specify groups of nodes. Moreover, the design support apparatus 10a adds the calculated mutually orthogonal Latin square to the mutually orthogonal Latin square data 16. The execution of such a process enables the design support apparatus 10a to specify groups of nodes even if the mutually orthogonal Latin square data 16 does not contain a mutually orthogonal Latin square in which the calculated number "s" of terminating switches is the number of elements in the row or column direction.

(5) Program

Figure 22:
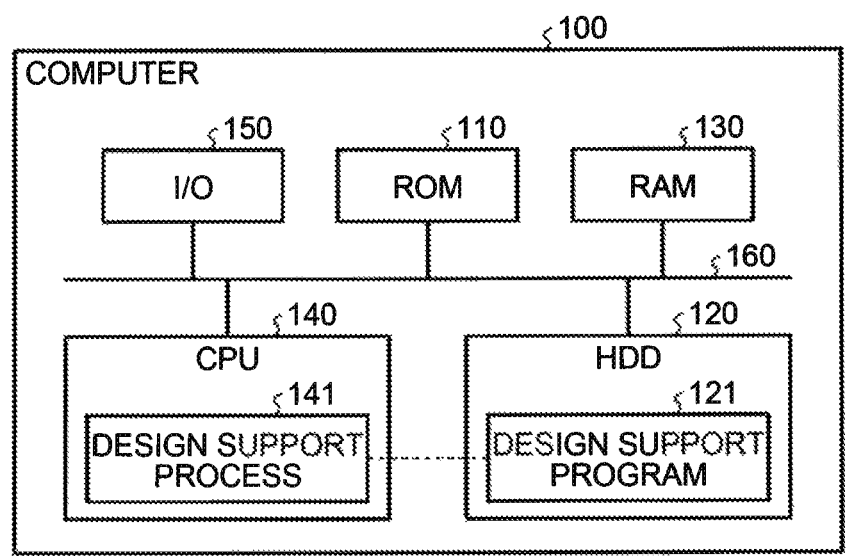
FIG. 22 is a diagram illustrating an example of a computer that executes a design support program.

The functions to be exhibited by the design support apparatuses 10 and 10a described in the above embodiments may be achieved by a computer executing a design support program prepared in advance. Hence, in the following, a description is given of an example of a computer that executes a design support program including similar functions to those of the above design support apparatus 10 with reference to FIG. 22. FIG. 22 is a diagram illustrating an example of the computer that executes the design support program.

In a computer 100 illustrated in FIG. 22, a ROM (Read Only Memory) 110, an HDD (Hard Disk Drive) 120, a RAM (Random Access Memory) 130, and a CPU (Central Processing Unit) 140 are connected by a bus 160. Moreover, in the computer 100 illustrated in FIG. 22, an I/O (Input Output) 150 to accept various parameters is connected by the bus 160 to the CPU 140 and the like.

A design support program 121 is held in the HDD 120 in advance. The CPU 140 reads out the design support program 121 from the HDD 120 to execute and accordingly the design support program 121 comes to function as a design support process 141 in the example illustrated in FIG. 22. The design support process 141 exhibits similar functions to the acceptance unit 11, the calculation unit 12, the specification unit 13, and the output unit 14, which are illustrated in FIG. 1. The design support process 141 may be configured to exhibit similar functions to the acceptance unit 11, the calculation unit 12a, the specification unit 13a, and the output unit 14, which are illustrated in FIG. 13.

The design support program described in the embodiment can be achieved by executing a program prepared in advance on a computer such as a personal computer or workstation. The program can be distributed via a network such as the Internet. Moreover, the program is recorded in a computer-readable recording medium such as a hard disk, a flexible disk (FD), a CD-ROM (Compact Disc Read Only Memory), an MO (Magneto Optical Disc), or a DVD (Digital Versatile Disc). Moreover, the program can also be executed by being read out by the computer from the recording medium.

The computer 100 may execute the design support program 121 using not the CPU 140 but an arithmetic unit such as an MPU or FPGA. Moreover, the above design support program 121 may be stored in, for example, the RAM 130 or ROM 110, or be executed by the CPU 140 in another method. For example, the programs are stored in "portable physical media" such as a flexible disk, what is called FD (Flexible Disk), a CD (Compact Disk)-ROM, a DVD (Digital Versatile Disk), a magneto-optical disk, and an IC card.

The computer 100 may acquire and execute the programs from these portable physical media. Moreover, the programs stored in another computer or a server apparatus may be acquired via public lines, the Internet, a LAN, a WAN (Wide Area Network), or the like, and be executed.

According to one embodiment, it is possible to design a network in which latency upon the communication of electronic devices is reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A design support apparatus comprising:
   a memory; and
   a processor coupled to the memory, wherein the processor executes a process including:
   accepting inputs of a number of nodes to be connected to a network, a number of networks to be connected to each node, and the number of nodes to be connected to a terminating device being a relay device to be connected to the nodes among relay devices relaying communication between nodes;
   calculating a number of terminating devices included in each network based on the number of nodes, the number of networks, and the number of nodes to be connected to the terminating device, the numbers having been accepted at the accepting;
   specifying nodes to be connected to each terminating device for each network such that each node is connected to any of the number of terminating devices calculated at the calculating and that individually different combinations of nodes are connected to the terminating devices included in all the networks; and
   outputting connection information indicating that the nodes specified at the specifying are connected to the terminating devices, wherein
   the specifying includes calculating a number of ports included in the each terminating device and designing connection relationships between the terminating devices for each network based on the calculated number of ports, the number of terminating devices, and the number of nodes, wherein
   the specifying further includes accepting designation of a number of levels of switches in each network from a user, and designing a tree network having the accepted number of levels.

2. The design support apparatus according to claim 1, wherein
   when the number of networks accepted at the accepting is two, the calculating includes calculating an integer including a minimum value among integers greater than a number obtained by dividing the number of nodes accepted at the accepting by the number of nodes to be connected to the terminating device, the number of nodes having been accepted at the accepting, and
   the specifying includes assigning, to the number of nodes accepted at the accepting, numbers of a matrix form in which the number of nodes to be connected to the terminating device, the number of nodes having been accepted at the accepting, is the number of elements in each row, and the number of the terminating devices calculated at the calculating is the number of elements in each column, specifies a group of nodes to which the same row number has been assigned, as a group of nodes to be connected to each terminating device included in a first network, and specifying a group of nodes to which numbers have been assigned in which the row numbers and the column numbers are different by one, as a group of nodes to be connected to each terminating device included in a second network.

3. The design support apparatus according to claim 1, wherein
   the calculating includes calculating a minimum integer indivisible by any integer equal to or less than the number of networks accepted at the accepting among integers greater than the number obtained by dividing the number of nodes accepted at the accepting by the number of nodes to be connected to the terminating device, the number of nodes having been accepted at the accepting, and
   the specifying includes assigning, to the number of nodes accepted at the accepting, numbers of a matrix form in which the number of nodes to be connected to the terminating device, the number of nodes having been accepted at the accepting, is the number of elements in each row, and the number of the terminating devices calculated at the calculating is the number of elements in each column, assigns integer numbers starting with zero to the number of networks accepted at the accepting, and specifying a group of nodes to which numbers have been assigned in which the row numbers are different by the same value as the integer number assigned to the network whenever the column numbers are different by one, as a group of nodes to be connected to each terminating device included in each network.

4. The design support apparatus according to claim 1, wherein
   the calculating includes calculating a minimum integer among integers equal to or greater than the value obtained by dividing the number of nodes accepted at the accepting by the number of nodes to be connected to the terminating device, the number of nodes having been accepted at the accepting, the integers including values that are indivisible by any integer equal to or less than the number of networks accepted at the accepting and that are powers of prime numbers, and
   the specifying includes assigning, to the number of nodes accepted at the accepting, numbers of a matrix form in which the number of nodes to be connected to the terminating device, the number of nodes having been accepted at the accepting, is the number of elements in each row, and the number of the terminating devices calculated at the calculating is the number of elements in each column, and, when the integer calculated at the calculating is a power of a prime number, associates each network with individual mutually orthogonal Latin squares in which the integer calculated at the calculating is the number of rows, and specifying, for each network, a group of nodes to which the same row and column numbers as elements including the same value have been assigned as a group of nodes to be connected to the terminating device, among elements of the mutually orthogonal Latin square associated with the network.

5. The design support apparatus according to claim 4, wherein
the process further includes storing mutually orthogonal Latin squares in which the number of rows is a power of a prime number, and
the specifying includes using a mutually orthogonal Latin square in which the number of rows is the same as the integer calculated at the calculating among the mutually orthogonal Latin squares stored at the storing, and specifying groups of nodes to be connected to the terminating devices.

6. A non-transitory computer-readable recording medium having stored therein a program that causes a computer to execute a design support process comprising:
accepting inputs of a number of nodes to be connected to a network, a number of networks to be connected to each node, and the number of nodes to be connected to a terminating device being a relay device to be connected to the nodes among relay devices relaying communication between nodes;
calculating a number of terminating devices included in each network based on the accepted number of nodes, number of networks, and number of nodes to be connected to the terminating device;
specifying nodes to be connected to each terminating device for each network such that each node is connected to any of the calculated number of terminating devices and that individually different combinations of nodes are connected to the terminating devices included in all the networks; and
outputting connection information indicating that the specified nodes are connected to the terminating devices, wherein
the specifying includes calculating a number of ports included in the each terminating device and designing connection relationships between the terminating devices for each network based on the calculated number of ports, the number of terminating devices, and the number of nodes, wherein
the specifying further includes accepting designation of a number of levels of switches in each network from a user, and designing a tree network having the accepted number of levels.

7. A design support method comprising:
accepting inputs of a number of nodes to be connected to a network, a number of networks to be connected to each node, and the number of nodes to be connected to a terminating device being a relay device to be connected to the nodes among relay devices relaying communication between nodes, using a processor;
calculating a number of terminating devices included in each network based on the accepted number of nodes, number of networks, and number of nodes to be connected to the terminating device, using the processor;
specifying nodes to be connected to each terminating device for each network such that each node is connected to any of the calculated number of terminating devices and that individually different combinations of nodes are connected to the terminating devices included in all the networks, using the processor; and
outputting connection information indicating that the specified nodes are connected to the terminating devices, using the processor, wherein
the specifying includes calculating the number of ports included in the each terminating device and designing connection relationships between the terminating devices for each network based on the calculated number of ports, the number of terminating devices, and the number of nodes, wherein
the specifying further includes accepting designation of a number of levels of switches in each network from a user, and designing a tree network having the accepted number of levels.

* * * * *